US011126720B2

United States Patent
Miserendino et al.

(10) Patent No.: US 11,126,720 B2
(45) Date of Patent: *Sep. 21, 2021

(54) SYSTEM AND METHOD FOR AUTOMATED MACHINE-LEARNING, ZERO-DAY MALWARE DETECTION

(71) Applicant: BLUVECTOR, INC., Arlington, VA (US)

(72) Inventors: Scott Miserendino, Baltimore, MD (US); Ryan Peters, Fairfax, VA (US); Donald Steiner, McLean, VA (US); Bhargav R. Avasarala, Arlington, VA (US); Brock D. Bose, Alexandria, VA (US); John C. Day, Palm Bay, FL (US)

(73) Assignee: BluVector, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,122

(22) Filed: May 26, 2017

(65) Prior Publication Data
US 2017/0262633 A1    Sep. 14, 2017

Related U.S. Application Data

(63) Continuation-in-part of application No. 15/076,073, filed on Mar. 21, 2016, now Pat. No. 9,665,713, (Continued)

(51) Int. Cl.
*G06F 21/56* (2013.01)
*G06N 5/02* (2006.01)
*G06K 9/62* (2006.01)

(52) U.S. Cl.
CPC ............ *G06F 21/566* (2013.01); *G06F 21/56* (2013.01); *G06F 21/564* (2013.01);
(Continued)

(58) Field of Classification Search
CPC ...... G06F 21/566; G06F 21/564; G06F 21/56; G06F 2221/034; G06K 9/6282; G06K 9/6262; G06K 9/6256; G06N 5/025
See application file for complete search history.

(56) References Cited

U.S. PATENT DOCUMENTS

| 5,675,711 A | 10/1997 | Kephart et al. |
| 5,912,039 A | 6/1999 | Brown |

(Continued)

OTHER PUBLICATIONS

Gopal et al., Statistical Learning for File-Type Identification, 2011, IEEE.*

(Continued)

*Primary Examiner* — David Garcia Cervetti
(74) *Attorney, Agent, or Firm* — BakerHostetler

(57) ABSTRACT

Improved systems and methods for automated machine-learning, zero-day malware detection. Embodiments include a system and method for detecting malware using multi-stage file-typing and, optionally pre-processing, with fall-through options. The system and method receive a set of training files which are each known to be either malign or benign, partition the set of training files into a plurality of categories based on file-type, in which the partitioning file-types a subset of the training files into supported file-type categories, train file-type specific classifiers that distinguish between malign and benign files for the supported file-type categories of files, associate supported file-types with a file-type processing chain that includes a plurality of file-type specific classifiers corresponding to the supported file-types, train a generic file-type classifier that applies to file-types that are not supported file-types, and construct a composite classifier using the file-type specific classifiers and the generic file-type classifier.

22 Claims, 21 Drawing Sheets

Related U.S. Application Data which is a continuation of application No. 14/038,682, filed on Sep. 26, 2013, now Pat. No. 9,292,688.

(60) Provisional application No. 61/705,938, filed on Sep. 26, 2012.

(52) U.S. Cl.
CPC ......... *G06K 9/6256* (2013.01); *G06K 9/6262* (2013.01); *G06N 5/025* (2013.01); *G06F 2221/034* (2013.01)

(56) References Cited

U.S. PATENT DOCUMENTS

| | | | |
|---|---|---|---|
| 6,141,241 A | 10/2000 | Ovshinsky et al. | |
| 6,633,855 B1* | 10/2003 | Auvenshine | G06F 16/00 |
| | | | 706/15 |
| 7,065,657 B1 | 6/2006 | Moran | |
| 7,072,876 B1 | 7/2006 | Michael | |
| 7,424,619 B1* | 9/2008 | Fan | G06F 21/552 |
| | | | 713/188 |
| 7,448,084 B1 | 11/2008 | Apap et al. | |
| 7,487,544 B2 | 2/2009 | Schultz et al. | |
| 7,496,228 B2* | 2/2009 | Landwehr | A01M 1/026 |
| | | | 382/165 |
| 7,519,998 B2 | 4/2009 | Cai et al. | |
| 7,890,469 B1* | 2/2011 | Maionchi | G06F 16/10 |
| | | | 707/654 |
| 7,912,907 B1* | 3/2011 | Mantel | H04L 51/12 |
| | | | 709/206 |
| 7,979,907 B2 | 7/2011 | Schultz et al. | |
| 8,015,284 B1 | 9/2011 | Isenberg et al. | |
| 8,037,535 B2 | 10/2011 | Maloof | |
| 8,087,079 B2* | 12/2011 | Ben-Itzhak | G06F 21/562 |
| | | | 726/22 |
| RE43,103 E | 1/2012 | Rozman et al. | |
| 8,099,785 B1 | 1/2012 | Pavlyushchik | |
| 8,104,090 B1 | 1/2012 | Pavlyushchik | |
| 8,161,548 B1* | 4/2012 | Wan | G06K 9/6228 |
| | | | 726/22 |
| 8,171,551 B2 | 5/2012 | Muttik et al. | |
| 8,181,247 B1 | 5/2012 | Pavlyushchik et al. | |
| 8,190,647 B1 | 5/2012 | Pereira et al. | |
| 8,250,655 B1 | 8/2012 | Malanov et al. | |
| 8,266,698 B1* | 9/2012 | Seshardi | G06F 21/53 |
| | | | 726/24 |
| 8,341,745 B1 | 12/2012 | Chau et al. | |
| 8,375,450 B1* | 2/2013 | Oliver | G06F 21/565 |
| | | | 726/24 |
| 8,401,982 B1* | 3/2013 | Satish | G06F 21/566 |
| | | | 706/20 |
| 8,413,235 B1 | 4/2013 | Chen et al. | |
| 8,413,244 B1* | 4/2013 | Nachenberg | G06F 21/565 |
| | | | 726/23 |
| 8,433,959 B1* | 4/2013 | Garfinkel | G06F 3/0683 |
| | | | 714/718 |
| 8,448,218 B2 | 5/2013 | Bori | |
| 8,453,242 B2 | 5/2013 | Chandnani | |
| 8,478,708 B1 | 7/2013 | Larcom | |
| 8,521,667 B2 | 8/2013 | Zhu et al. | |
| 8,528,091 B2* | 9/2013 | Bowen | H04L 63/1441 |
| | | | 726/24 |
| 8,533,134 B1* | 9/2013 | Zhao | G06N 20/00 |
| | | | 706/12 |
| 8,555,388 B1 | 10/2013 | Wang et al. | |
| 8,561,180 B1 | 10/2013 | Nachenberg | |
| 8,561,195 B1 | 10/2013 | Chen et al. | |
| 8,561,196 B1 | 10/2013 | Viljoen et al. | |
| 8,577,135 B2* | 11/2013 | Garg | G06T 7/90 |
| | | | 382/165 |
| 8,578,497 B2 | 11/2013 | Antonakakis et al. | |
| 8,584,241 B1 | 11/2013 | Jenks et al. | |
| 8,590,045 B2 | 11/2013 | Niemela et al. | |
| 8,627,469 B1 | 1/2014 | Chen et al. | |
| 8,635,171 B1 | 1/2014 | Kennedy | |
| 8,649,613 B1* | 2/2014 | Leung | G06K 9/6224 |
| | | | 382/224 |
| 8,667,593 B1 | 3/2014 | Shnitzer | |
| 8,671,449 B1* | 3/2014 | Nachenberg | H04L 63/145 |
| | | | 726/24 |
| 8,682,812 B1 | 3/2014 | Ranjan | |
| 8,683,585 B1 | 3/2014 | Chen et al. | |
| 8,713,007 B1* | 4/2014 | Korolev | G06F 16/353 |
| | | | 707/729 |
| 8,719,924 B1 | 5/2014 | Williamson et al. | |
| 8,719,939 B2* | 5/2014 | Krasser | G06F 21/564 |
| | | | 726/24 |
| 8,726,388 B2 | 5/2014 | Turbin | |
| 8,738,906 B1* | 5/2014 | Sampath | H04N 21/643 |
| | | | 713/166 |
| 8,745,760 B2 | 6/2014 | Poulson | |
| 8,769,678 B2 | 7/2014 | Dubrovsky et al. | |
| 8,769,684 B2* | 7/2014 | Stolfo | H04L 63/1491 |
| | | | 726/23 |
| 8,789,172 B2* | 7/2014 | Stolfo | G06F 21/566 |
| | | | 726/22 |
| 8,799,190 B2 | 8/2014 | Stokes et al. | |
| 8,819,024 B1* | 8/2014 | Toderici | G06F 16/36 |
| | | | 707/740 |
| 8,819,825 B2* | 8/2014 | Keromytis | H04L 63/1408 |
| | | | 726/24 |
| 8,826,431 B2 | 9/2014 | Pereira et al. | |
| 8,826,439 B1* | 9/2014 | Hu | G06F 21/56 |
| | | | 726/24 |
| 8,832,829 B2 | 9/2014 | Manni et al. | |
| 8,838,992 B1 | 9/2014 | Zhu et al. | |
| 8,875,294 B2 | 10/2014 | Golavanov | |
| 8,935,788 B1* | 1/2015 | Diao | G06F 21/561 |
| | | | 726/24 |
| 8,954,358 B1* | 2/2015 | Zhang | G06K 9/6292 |
| | | | 706/12 |
| 8,959,631 B2* | 2/2015 | Beryozkin | H04L 63/1458 |
| | | | 726/22 |
| 9,009,829 B2* | 4/2015 | Stolfo | G06F 21/554 |
| | | | 726/23 |
| 9,183,384 B1* | 11/2015 | Bruhmuller | H04L 63/105 |
| 9,349,006 B2* | 5/2016 | Zhou | G06N 20/00 |
| 9,356,941 B1* | 5/2016 | Kislyuk | H04L 63/14 |
| 9,531,736 B1* | 12/2016 | Torres | H04L 63/1441 |
| 2003/0037258 A1* | 2/2003 | Koren | H04L 63/0209 |
| | | | 726/15 |
| 2003/0065926 A1 | 4/2003 | Schultz et al. | |
| 2003/0074573 A1 | 4/2003 | Hursey | |
| 2003/0131256 A1 | 7/2003 | Ackroyd | |
| 2004/0051736 A1* | 3/2004 | Daniell | H04L 51/14 |
| | | | 715/752 |
| 2004/0218327 A1* | 11/2004 | Williamson | H04L 63/0227 |
| | | | 361/93.1 |
| 2004/0267893 A1* | 12/2004 | Lin | H04L 51/12 |
| | | | 709/207 |
| 2005/0015606 A1 | 1/2005 | Blamires et al. | |
| 2005/0021994 A1 | 1/2005 | Barton et al. | |
| 2005/0027686 A1 | 2/2005 | Shipp | |
| 2005/0235012 A1* | 10/2005 | Harry | G06F 8/71 |
| 2005/0262567 A1 | 11/2005 | Carmona | |
| 2005/0265331 A1* | 12/2005 | Stolfo | G06F 21/55 |
| | | | 370/389 |
| 2006/0026675 A1* | 2/2006 | Cai | G06F 21/562 |
| | | | 726/22 |
| 2006/0037080 A1* | 2/2006 | Maloof | G06F 21/562 |
| | | | 726/24 |
| 2006/0047617 A1* | 3/2006 | Bacioiu | G06K 9/6267 |
| | | | 706/59 |
| 2006/0095971 A1 | 5/2006 | Costea et al. | |
| 2006/0218110 A1* | 9/2006 | Simske | G06N 20/00 |
| | | | 706/45 |
| 2006/0265745 A1* | 11/2006 | Shackleton | G06F 21/552 |
| | | | 726/22 |
| 2007/0039052 A1 | 2/2007 | Chandnani | |
| 2007/0100812 A1* | 5/2007 | Simske | G06F 16/93 |

(56) References Cited

U.S. PATENT DOCUMENTS

| | | | |
|---|---|---|---|
| 2007/0100905 A1 | 5/2007 | Masters et al. | |
| 2007/0168547 A1 | 7/2007 | Krywaniuk | |
| 2007/0174270 A1 | 7/2007 | Goodwin et al. | |
| 2007/0174911 A1 | 7/2007 | Kronenberg et al. | |
| 2007/0240221 A1 | 10/2007 | Tuvell et al. | |
| 2007/0266421 A1 | 11/2007 | Vaidya et al. | |
| 2007/0277241 A1 | 11/2007 | Repasi et al. | |
| 2007/0297337 A1* | 12/2007 | Beygelzimer | H04L 12/66 370/241 |
| 2008/0010538 A1* | 1/2008 | Satish | G06F 21/563 714/38.13 |
| 2008/0016570 A1 | 1/2008 | Capalik | |
| 2008/0047012 A1 | 2/2008 | Rubin et al. | |
| 2008/0124686 A1* | 5/2008 | Forman | G09B 7/02 434/219 |
| 2008/0127336 A1 | 5/2008 | Sun et al. | |
| 2008/0141371 A1 | 6/2008 | Bradicich et al. | |
| 2008/0177680 A1 | 7/2008 | Laxman et al. | |
| 2008/0177684 A1 | 7/2008 | Laxman et al. | |
| 2008/0201778 A1 | 8/2008 | Guo et al. | |
| 2008/0201779 A1 | 8/2008 | Tahan et al. | |
| 2008/0263669 A1 | 10/2008 | Alme | |
| 2008/0320548 A1* | 12/2008 | Tripathi | H04L 63/1408 726/1 |
| 2009/0013405 A1* | 1/2009 | Schipka | G06F 21/562 726/22 |
| 2009/0094175 A1 | 4/2009 | Provos et al. | |
| 2009/0192979 A1 | 7/2009 | Lunde | |
| 2009/0193293 A1* | 7/2009 | Stolfo | H04L 63/1416 714/26 |
| 2009/0222395 A1* | 9/2009 | Light | G06F 16/353 706/47 |
| 2009/0241194 A1 | 9/2009 | Thomas | |
| 2009/0265650 A1* | 10/2009 | Canovai | G06F 9/543 715/769 |
| 2009/0300765 A1* | 12/2009 | Moskovitch | G06K 9/6256 726/24 |
| 2009/0313700 A1 | 12/2009 | Horne | |
| 2009/0327115 A1* | 12/2009 | Schilder | G06F 40/295 705/35 |
| 2010/0064369 A1* | 3/2010 | Stolfo | G06F 21/562 726/24 |
| 2010/0077479 A1 | 3/2010 | Viljoen | |
| 2010/0154063 A1 | 6/2010 | Hutton et al. | |
| 2010/0162395 A1 | 6/2010 | Kennedy | |
| 2010/0162400 A1* | 6/2010 | Feeney | G06F 21/563 726/24 |
| 2010/0180344 A1 | 7/2010 | Malyshev et al. | |
| 2010/0192222 A1* | 7/2010 | Stokes | G06F 21/563 726/22 |
| 2010/0229239 A1 | 9/2010 | Rozenberg et al. | |
| 2010/0250501 A1* | 9/2010 | Mandagere | G06F 16/285 707/692 |
| 2010/0262693 A1* | 10/2010 | Stokes | H04L 63/1408 709/225 |
| 2010/0284623 A1* | 11/2010 | Chen | G06K 9/00463 382/224 |
| 2010/0313270 A1* | 12/2010 | Kim | G06F 1/28 726/24 |
| 2011/0004935 A1 | 1/2011 | Moffie et al. | |
| 2011/0083187 A1* | 4/2011 | Malanov | G06F 21/562 726/24 |
| 2011/0137898 A1* | 6/2011 | Gordo | G06F 16/35 707/737 |
| 2011/0162070 A1* | 6/2011 | Krasser | G06F 21/564 726/23 |
| 2011/0167493 A1* | 7/2011 | Song | H04L 63/1466 726/23 |
| 2011/0170768 A1* | 7/2011 | Alldrin | G06T 7/162 382/159 |
| 2011/0219424 A1* | 9/2011 | Panasyuk | G06F 21/85 726/1 |
| 2012/0005750 A1* | 1/2012 | Satish | G06F 21/52 726/23 |
| 2012/0030293 A1* | 2/2012 | Bobotek | G06Q 10/10 709/206 |
| 2012/0084859 A1* | 4/2012 | Radinsky | G06Q 10/06 726/23 |
| 2012/0158626 A1 | 6/2012 | Zhu et al. | |
| 2012/0215727 A1* | 8/2012 | Malik | G06N 5/02 706/12 |
| 2012/0260342 A1 | 10/2012 | Dube et al. | |
| 2012/0278890 A1* | 11/2012 | Maatta | H04L 63/1425 726/23 |
| 2012/0284691 A1* | 11/2012 | Aljammaz | G06F 21/562 717/120 |
| 2012/0317644 A1* | 12/2012 | Kumar | G06F 21/566 726/24 |
| 2013/0097661 A1* | 4/2013 | Ma | G06F 21/56 726/1 |
| 2013/0097706 A1* | 4/2013 | Titonis | G06F 21/56 726/24 |
| 2013/0198119 A1* | 8/2013 | Eberhardt, III | G06N 20/00 706/12 |
| 2013/0198841 A1* | 8/2013 | Poulson | G06F 21/51 726/23 |
| 2013/0198842 A1* | 8/2013 | Klein | G06F 21/554 726/23 |
| 2013/0247197 A1* | 9/2013 | O'Brien | H04L 43/10 726/24 |
| 2013/0291111 A1* | 10/2013 | Zhou | G06F 21/563 726/23 |
| 2013/0303159 A1* | 11/2013 | Gathala | H04W 24/00 455/425 |
| 2013/0304676 A1* | 11/2013 | Gupta | G06N 20/00 706/12 |
| 2013/0304677 A1* | 11/2013 | Gupta | G06N 5/043 706/12 |
| 2013/0304869 A1* | 11/2013 | Gupta | G06F 21/554 709/219 |
| 2013/0318124 A1* | 11/2013 | Ohta | G06F 16/3347 707/780 |
| 2013/0326625 A1* | 12/2013 | Anderson | G06F 21/566 726/23 |
| 2013/0332423 A1* | 12/2013 | Puri | G06F 16/2358 707/687 |
| 2014/0006354 A1* | 1/2014 | Parkison | G06F 3/067 707/649 |
| 2014/0006357 A1* | 1/2014 | Davis | G06F 16/182 707/667 |
| 2014/0007239 A1* | 1/2014 | Sharpe | G06F 16/137 726/24 |
| 2014/0053261 A1* | 2/2014 | Gupta | G06F 21/316 726/22 |
| 2014/0090061 A1* | 3/2014 | Avasarala | G06F 21/56 726/24 |
| 2014/0123290 A1 | 5/2014 | Li et al. | |
| 2014/0150100 A1* | 5/2014 | Gupta | G06F 21/316 726/22 |
| 2014/0150105 A1 | 5/2014 | Yu | |
| 2014/0181973 A1 | 6/2014 | Lee et al. | |
| 2014/0297572 A1* | 10/2014 | Zambon | H04L 63/1416 706/12 |
| 2014/0298460 A1 | 10/2014 | Xue et al. | |
| 2014/0317734 A1* | 10/2014 | Valencia | G06F 21/316 726/22 |
| 2014/0337862 A1* | 11/2014 | Valencia | G06F 21/567 719/313 |
| 2015/0020203 A1* | 1/2015 | Xie | G06F 21/56 726/24 |
| 2015/0026810 A1* | 1/2015 | Friedrichs | H04L 63/1416 726/23 |
| 2015/0052601 A1* | 2/2015 | White | H04L 63/1416 726/13 |

(56) References Cited

U.S. PATENT DOCUMENTS

| | | | |
|---|---|---|---|
| 2015/0200962 A1* | 7/2015 | Xu ........................ | G06F 21/566 726/23 |
| 2015/0248556 A1* | 9/2015 | Sickendick ........... | G06F 21/563 726/23 |
| 2018/0025157 A1* | 1/2018 | Titonis .................. | G06F 21/562 726/24 |

OTHER PUBLICATIONS

Gopal et al., File-type Identification with Incomplete Information, 2010, ACM.*

Li et al., Fileprints: Identifying File Types by n-gram Analysis, IEEE, 2005.*

Firdausi et al., Analysis of Machine Learning Techniques Used in Behavior-Based Malware Detection, IEEE, 2010.*

Natesan et al., Cascaded classifier approach based on Adaboost to increase detection rate of rare network attack categories, IEEE, Apr. 2012.*

Shafiq et al., Embedded Malware Detection Using Markov n-Grams, Springer-Verlaf, 2008.*

Shahzad et al., Veto-based Malware Detection, IEEE, 2012.*

Santos et al., Collective Classification for Unknown Malware Detection, IEEE, Jul. 2011.*

Shafiq et al., Malware Detection using Statistical Analysis of Byte-Level File Content, ACM, 2009.*

Learning to Detect and Classify Malicious Executables in the Wild, Journal of Machine Learning Research 7 (Dec. 2006) pp. 2721-2724, J. Zico Kolter et al.

Selecting Features to Classify Malware, 2012 Adobe Systems Incorporated, Kathik Raman, Security Researcher, Adobe PSIRT.

Lu et al., Clustering botnet communication traffic based on n-gram feature selection, 2011, Elsevier.

Masud et al., Cloud-Based Malware Detection for Evolving Data Streams, Oct. 2011, ACM.

Rafique et al., xMiner: Nip the Zero Day Exploits in the Bud, 2011, IEEE.

Shabtai et al., Detection of malicious code by applying machine learning classifiers on static features: A state-of-the-art survey, 2009, Elsevier.

Teh et al, Human-Readable Real-Time Classifications of Malicious Executables, Dec. 2012, Edith Cowa University.

* cited by examiner

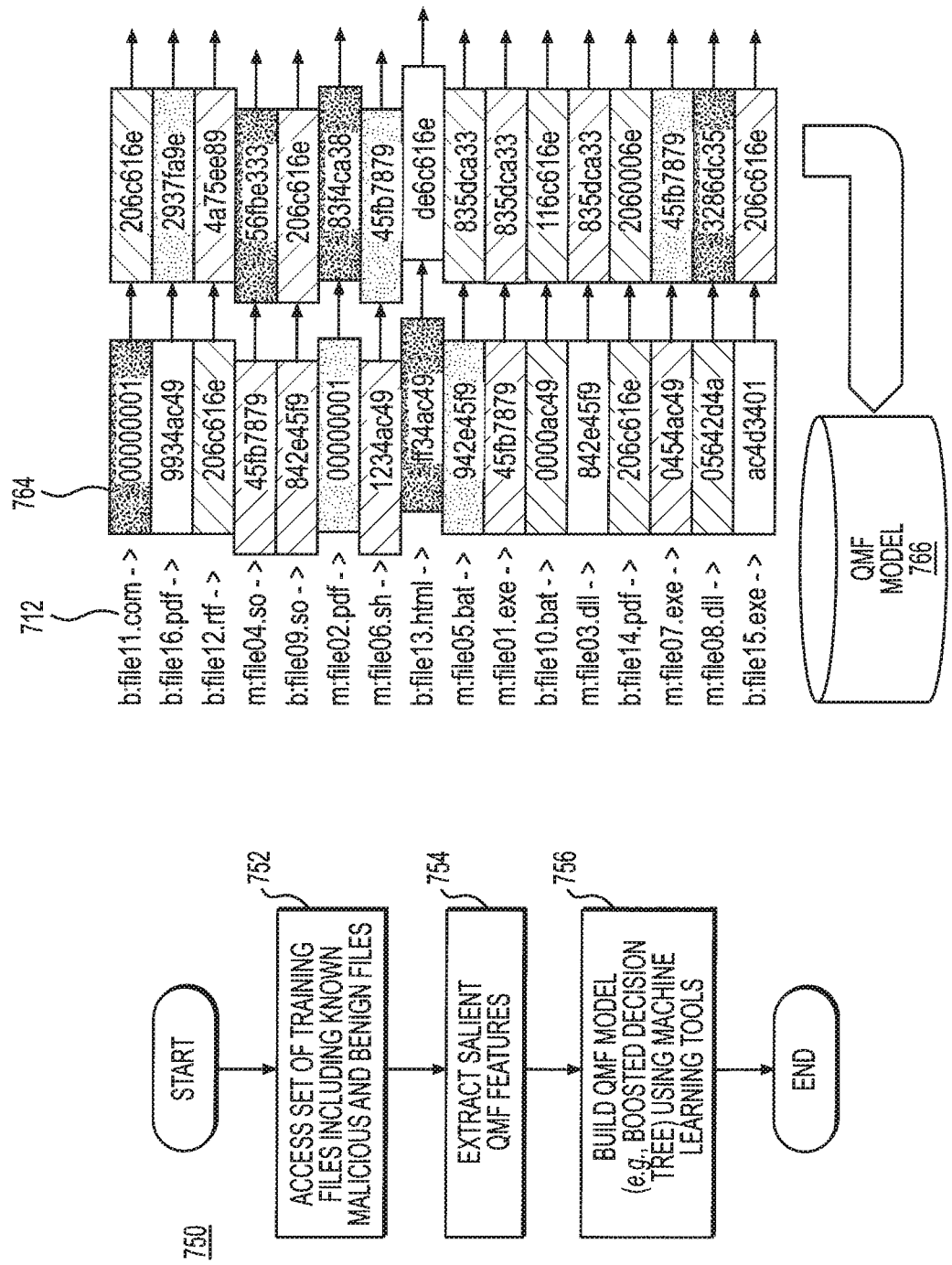

SYSTEM AND METHOD FOR AUTOMATED MACHINE-LEARNING, ZERO-DAY MALWARE DETECTION

CROSS REFERENCE TO RELATED APPLICATIONS

This application is a continuation-in-part and claims priority from U.S. application Ser. No. 15/076,073, entitled "Improved System and Method for Automated Machine-Learning, Zero-Day Malware Detection," filed Mar. 21, 2016, which is a continuation of and claims priority from U.S. Pat. No. 9,292,688, which claims priority from U.S. Provisional Patent Appl. No. 61/705,938, filed on Sep. 26, 2012. All of the foregoing are hereby incorporated herein by reference in their entirety.

BACKGROUND

Detection of cyber intrusion attempts is a key component to cyber security. Current commercial anti-virus and intrusion detection software (IDS) rely largely on signature-based methods to identify malicious code before the malicious code can cause harm to computer systems. However, signature-based mechanisms are ineffective against zero-day exploits since the signature of zero-day malware is, by definition, unknown as the malware has not previously been identified as such.

Commercial IDS, such as provided by McAfee, Symantec, or Sophos, rely on a signature-based approach to identifying malicious code. The signature, essentially a fingerprint for malware, must already be known and deployed on the current system, usually through an anti-virus update or patch, for the IDS software to be able to detect the threat. This paradigm has several significant drawbacks:

The increasing rate at which new strains of malware are introduced means that ever increasing resources must be dedicated to generating, storing, and accessing malware signatures.

Even small alterations to existing malware render them invisible to signature detection, and The very nature of the signature generation process dictates that zero-day malware will be invisible until a sample can be identified, isolated, and analyzed. Only until then can a signature be generated and pushed out to the intrusion detection systems.

Consequently, the problem is that zero-day malware that has not been seen before must be identified as rapidly as possible while maintaining high accuracy by reducing both false negatives (amount of malware erroneously classified as not malware) and false positives (amount of non-malware erroneously classified as malware). Mechanisms must be developed that can identify zero-malware quickly and with high accuracy (including few false alarms).

Generally there are two broad types of automated malware detection systems: 1) Instance Matching (signature-based methods) and 2) Class Matching.

1) As discussed above, instance-matching (also called "template-matching") detectors operate by memorizing and exactly matching byte patterns (a signature) within a specific instance of a malware. The resulting template is effective for identifying other exact instances of the same malware. Though conceptually simple to implement, as discussed above there are several major disadvantages to this methodology:

a. Many thousands of templates are needed to cover the entire malware domain.

b. Not effective against new ("zero-day") threats because it takes time (on the order of many hours or days) to analyze the newly discovered threats and distribute effective templates to recognize them.

c. Instance-matching templates are "brittle" in the sense that malware authors can easily mitigate them by minor editing of the software codes. In fact, normal evolution of software often renders templates ineffective against new variants of the same malware codes.

2) Class-matching malware detectors are a fairly new development, designed to mitigate the shortcomings of instance-matching detectors. The main idea in class-matching malware detectors is to use machine-learning techniques to construct models that recognize entire classes of malware that share a common set of "features" such as specific sets of byte codes ("n-grams") or the relative frequency of occurrence of key byte-patterns. These models consist of classification rules sets or decision trees which infer the malicious nature of a particular instance of software, based on the presence or absence of key byte code patterns. The models are derived from analysis of the features of known malicious and benign sets (the "training set").

These models are more difficult to create but have several advantages over instance-matching detectors:

a. They can classify instances that were not in the training set, based on shared characteristic patterns, and, therefore, can be effective against zero-day threats.

b. The byte patterns tend to be very short and position independent and, therefore, are not as brittle as instance-matching templates.

c. Fewer models are required because each model can cover a broad set of instances.

The class-matching approach uses information theory and machine-learning techniques to identify general "features" of known malware through a "classifier" and to use the presence of these features to identify an unknown file as malware or not. This paradigm eliminates the need to know exactly what you are looking for in order to be able to find it. Specifically, the "classifier" is a decision tree based on "features" (n-grams, or sequences of n consecutive bytes; a good value for n is 4) present in either a binary file or in a system call or execution trace generated by execution of the file. The classifier is created by applying machine-learning algorithms (training) on a set of known malware and known benign-ware. Work on machine-learning based intrusion detection systems has generally only been pursued at the academic level. These academic approaches have generally used only a small set (less than 1,000 files) of malware to train on, yielding poor accuracy for a wide number of files.

Despite the advantages class-matching detectors have over instance-matching detectors, class-matching detectors also have problems. For example, class-matching detectors tend to have higher false-alarm rates because they rely on byte code patterns contained in training sets containing specific examples of malicious and benign software. Benign software with similar byte sequences to malicious software may be mistakenly classified as malicious. Since the classifiers generally return a probability that the file is malicious, the false alarm rate can be reduced, at the expense of the detection rate, by increasing the threshold above which a file is flagged as malicious. Instance matching techniques, by their very nature, are generally immune to false alarms. Class-matching detectors also have been extremely slow and time-consuming to operate, consequently ineffective in a commercial or practical setting.

Examples of known class-matching methods are described in Kolter, J. Z. and Mallof, M. A. "*Learning to*

*detect and classify malicious executables in the wild."* *Journal of Machine Learning Research* 7 (2006) ("Kolter-Maloof"), U.S. Pat. No. 8,037,535 to Maloof, U.S. Pat. No. 7,519,998 to Cai, U.S. Pat. No. 7,487,544 to Schultz et al., and U.S. P.G.Pub. No. 20090300765 to Moskovitch et al. These publications do not provide solutions to the above-described problems of high false-alarm rates or ineffectiveness and have only been demonstrated in academic settings.

SUMMARY

Described herein are embodiments of systems and methods that overcome the disadvantages of the prior art and provide improved systems and methods for automated machine-learning, zero-day malware detection. These advantages and others may be achieved by, for example, a system and method for detecting malware using multi-stage file-typing and, optionally pre-processing, with fall-through options. The system and method receive a set of training files which are each known to be either malign or benign, partition the set of training files into a plurality of categories based on file-type, in which the partitioning file-types a subset of the training files into supported file-type categories, train file-type specific classifiers that distinguish between malign and benign files for the supported file-type categories of files, associate supported file-types with a file-type processing chain that includes a plurality of file-type specific classifiers corresponding to the supported file-types, train a generic file-type classifier that applies to file-types that are not supported file-types, and construct a composite classifier using the file-type specific classifiers and the generic file-type classifier.

These and other advantages may also be achieved by a system and method for improved zero-day malware detection. The system and method receive a set of training files including known malicious and benign files, receive feature selection configuration input, select and extract salient features from the set of training files based on received feature selection input, in which selecting and extracting features may extract n-gram and non n-gram features, build a model for file classification with the selected and extracted features using machine learning tool, and apply the file classification model to unknown, target files to detect malware.

BRIEF DESCRIPTION OF THE DRAWINGS

The following detailed description of embodiments, will be better understood when read in conjunction with the appended drawings. It should be understood that the invention should not be limited to the precise arrangements and instrumentalities shown. In the drawings:

FIG. 7B is a flowchart and diagram illustrating an embodiment of an improved system and method for automated machine-learning, zero-day malware detection using QMF.

DETAILED DESCRIPTION

Described herein are embodiments of an improved system and method for automated machine-learning, zero-day malware detection. Embodiments include a composite classifier useful for malware detection. Embodiments include an extensible feature vector generator (EFVG) that facilitates and manages the addition or removal of attributes, attribute classes and corresponding feature derivation methods in a machine-learning system. Embodiments include a qualified meta-features (QMF) feature extraction algorithm for increasing accuracy and reducing "false positive" errors in malware detection. Embodiments provide improvements in malware detection over known systems and methods. Embodiments provide significant improvements over instance-matching, or signature-based, malware detection; for example, embodiments enable improved zero-day malware detection. Embodiments also provide significant improvements over class-matching malware protection; for example, embodiments enable zero-day malware detection with a much lower rate of false alarms and higher operational efficiency.

A composite classifier is an operational technique for improving the accuracy of machine-learning based malware detection techniques. In other words, embodiments will classify true malware more accurately (i.e., reduce false negatives) while committing fewer errors of mistaken identity (i.e., reduce false positives). Embodiments form distinct categories of files by using "external" attributes of a file, i.e., attributes that can be determined without executing the file or without in-depth knowledge of the file's structure. Such categories may include file type (e.g., pdf, doc, executable, etc. . . . ). Embodiments may determine file type or other external attributes using a number of techniques, such as using the file extension or the libmagic library (used by the Linux 'file' command), to categorize files. For each of these categories, a separate classifier (usually a decision tree) may be generated using machine-learning techniques based on known samples of malicious and benign files in that category. Embodiments may combine these classifiers into a composite classifier residing in a zero-day malware detection system.

Embodiments of the malware detection system utilizing a composite classifier may pre-screen a file under consideration to first determine its category. After pre-screening, embodiments may then use the corresponding classifier tailored to the file's category to classify the file as benign or malicious. Using the composite classifier as described, embodiments substantially improve on known class-detection systems that utilize a single generic classifier developed for all files regardless of category. Embodiments, therefore, provide a higher accuracy. Moreover, embodiments are more efficient in that files are analyzed only against classifiers applicable to a file type, as opposed to all classifiers, which are necessarily more and, therefore, take longer to apply.

Figure 1:
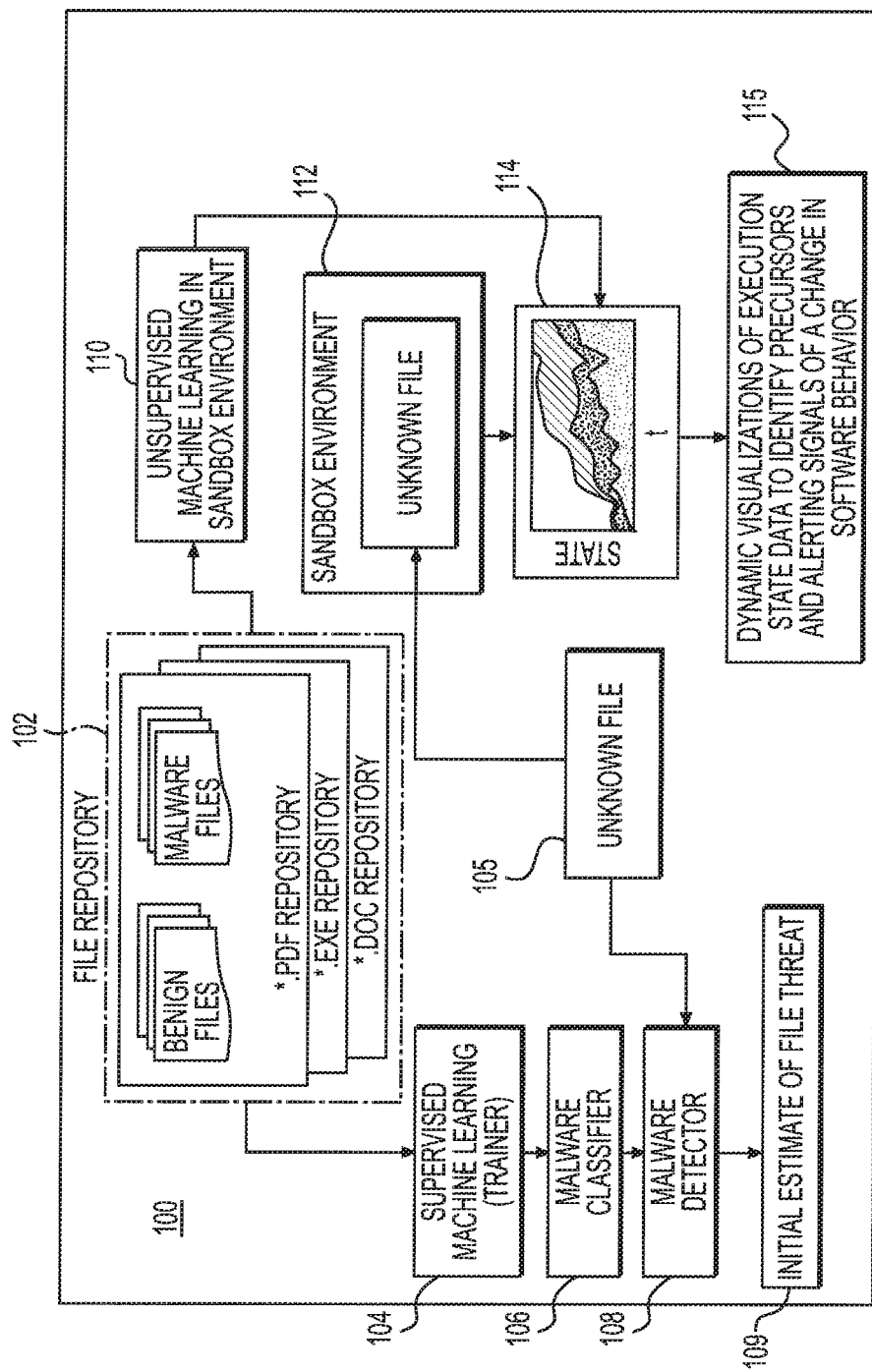
FIG. 1 is a block diagram illustrating an embodiment of a system and method for automated machine-learning, zero-day malware detection.

With reference to FIG. 1, shown is a block diagram of an embodiment of a system and method for automated machine-learning, zero-day malware detection. The embodiment shown illustrates a malware detection system 100 in which the composite classifier may be used to provide improved malware detection. The embodiment includes a repository of files 102 known to be malign (malware) and benign (e.g., a "training repository"). Such a repository 102 may include a variety of file types, e.g., .pdf, .exe, .doc, etc. A machine-learning program, application, routine, programmed logic circuit, or other automated machine-learning implementation (a "machine-learning trainer 104") may be executed on the repository of files to identify features that are indicative of a file being malware. Such features may be n-grams, or sequences of n consecutive bytes (e.g., n may be 4, but n may be other values, including 4, 6, 8, although experiments have shown that a value of 4 generally works best) present in either a binary file or in a system call or execution trace generated by execution of the file. The machine-learning trainer 104 analyzes the files in the repository of files to determine n-grams that are commonly, as well as uncommonly, found in the malign files in the repository, or in the system calls or execution traces generated by execution of the file (accordingly, the machine-learning trainer may execute files in a, e.g., sandbox or safe environment (e.g., where execution will do no harm) in order to analyze the system calls and/or execution traces generated by execution of the file.

Using the n-grams, the machine-learning trainer 104 creates binary feature vector representations of each file in the training repository. The machine-learning trainer 104 evaluates the features of the entire training collection to identify a subset of those that are the most effective at distinguishing between malign and benign files. The machine-learning trainer 104 may perform this feature selection and extraction analysis as described in, for example, Kolter-Maloof. The machine-learning trainer 104 may include settings that indicate how frequently a feature must appear in malign files to be considered a good indicator of malware and, therefore, a malware classifier. The frequency setting may also be set relative to how often the feature appears, if at all, in benign files. A given feature that appears in a high frequency of malign files and a high frequency of benign files would not be particularly useful as a malware classifier. Such settings may be adjusted to minimize false positives and false negatives.

As indicated in FIG. 1, the machine-learning trainer 104 may generate the classifiers in a supervised manner—e.g., with a human operator supervising the classification process and results, able to edit, remove and add classifiers, adjust settings that determine how frequently a feature should appear in malign files to be identified as a malware classifier, etc. It is also important to note that the same techniques described above for generating malware classifiers may be used to generate benign file classifiers (e.g., features that are indicative of a file being benign).

With continuing reference to FIG. 1, once an embodiment generates the classifiers, the embodiment may generate a malware classifier 106. A malware classifier 106 may be a database, listing, program, application, routine, programmed logic circuit, or other automated implementation, that includes a combination of the subset of features identified above, by the machine-learning trainer 104, as being most effective at distinguishing between malign and benign files. The malware classifier 106 may be, in turn, utilized by a malware detector 108 to detect malware. The malware detector 108 may be a program, application, routine, programmed logic circuit, or other automated implementation that applies the malware classifier to unknown files 105 to provide an indication of whether the files are malign or benign. The malware detector 108 may produce output that provides an initial estimate of whether a file is malign or benign 109. The initial estimate may be a percentage likelihood that the file is malign. The malware detector 108 may generate this estimate by determining how many features are present in the file and considering (e.g., weighing) the percentage of training malign files in which each given feature was present. For example, if a given feature was found to be present in 95% of all malware files and 0% of all benign files in the training set, the malware detector may consider that feature's presence as indicating a high likelihood that the unknown file was malign. Likewise, if e.g., fifty out of one-hundred features indicative of malware are found in an unknown file, such fact may also indicate a high likelihood that the unknown file was malign.

An embodiment may also generate another form of malware classifier by executing known malign files in the training repository 102 in a sandbox environment and observing the behavior of the executed files and the environment. A sandbox environment is a testing environment, a virtual container, in which untrusted programs can be safely run. The embodiment of a system and method for automated machine-learning, zero-day malware detection, as shown in FIG. 1, may include a machine-learning trainer 110 that executes known malware executables in the sandbox environment and observes execution state data as features to identify precursors and alerting signals of change in software behavior 115 for the malware. The machine-learning trainer 110 may be the same machine-learning trainer described above and may do this without supervision. An embodiment may incorporate the identified precursors and alerting signals into classifiers, while also using a graphical, dynamic visualization of the execution state of malware. When used to detect malware, an embodiment may then execute unknown files in the same or similar sandbox environment 112 or in a live running system (that is not a sandbox). The embodiment may (1) analyze the system calls and/or execution traces generated by the execution of the unknown file to determine what malware features are present in the system calls and/or execution traces and (2)

compare the execution state data (e.g., a graphical, dynamic visualization 114 of the execution state data) of the unknown file to the stored precursors and alerting signals to determine if there are likely matches to the execution state data of known malware from the training repository. An embodiment may perform this comparison by comparing dynamic, graphical visualizations 114 of the execution state data of the unknown file and known malware. If such comparisons show similarities or matches, this fact may be used to provide greater confidence that the unknown file is malign.

Figure 2:
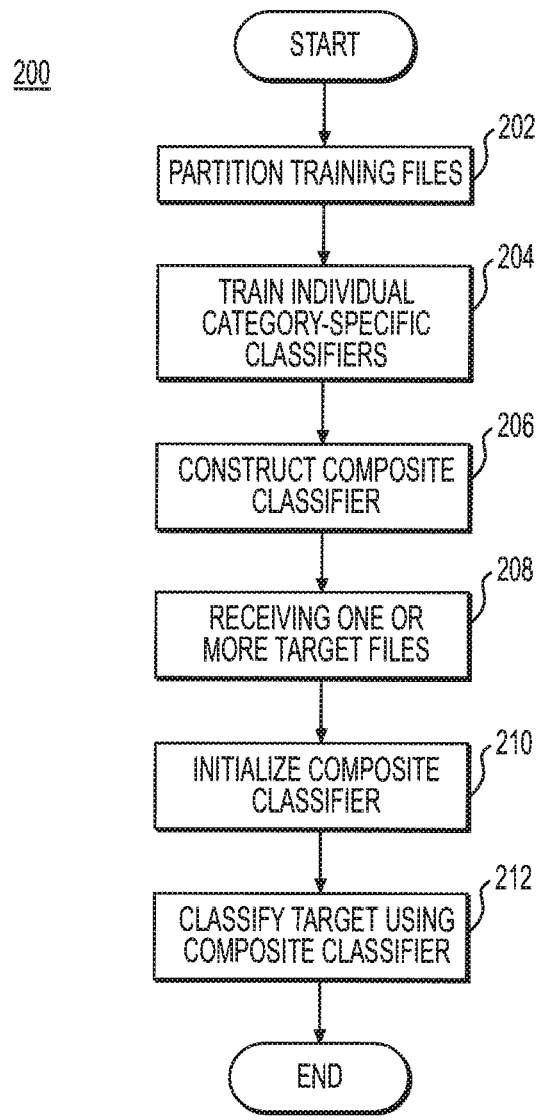
FIG. 2 is a flowchart illustrating an embodiment of an improved method for automated machine-learning, zero-day malware detection using a composite classifier.

With reference now to FIG. 2, shown is an embodiment of a method 200 that provides a composite classifier useful for malware detection that improves on the system and method illustrated in FIG. 1. The composite classifier achieves a significant improvement in accuracy over standard machine-learning malware detection schemes by (1) generating a composite classifier that includes classifiers for categories of files determined by external attributes of files and (2) using an additional pre-screening step prior to application of the composite classifier to determine, from the same or similar external attributes, to which category of file the target unknown file belongs. This pre-screening of the target file under analysis is used to allocate the target file to a classifier specifically tailored to distinguish among benign or malicious files over a narrower category of files (e.g., a single category of files). This process is motivated by the empirical observation that machine-learning classifiers evince superior accuracy when trained and operated on a category of objects of greater homogeneity.

The narrowing of the field of scope of classification is accomplished in three distinct phases:

1. Partitioning of files into distinct categories based on file types representing similarities between composition of the files;

2. Production of category specific classifiers based on the partitions from Phase 1; and 3. The ability to allocate target unknown files (files for analysis) to appropriate categorical classifiers for classification on the fly.

With continuing reference to FIG. 2, the first phase partitions the space of training files into meaningful sets of categories based on, for example, file types (portable executables, pdfs, Word™ document files, Excel™ files, etc.) (block 202). Partitioning 202 of the training files may be a two part process: determine the file type of each training file and group the training files into groups of same-type files. This may be done using a variety of different processes. One way is to simply use the file extension to determine the file type. However, file extensions are not necessarily accurate representations of the file type. An alternate and better way is to build a categorization schema based on the file type as determined by, e.g., the open source software, libmagic, used by the Linux 'file' command. Libmagic uses "magic numbers" (a four-byte number located in the beginning of most file formats to identify the file format) and file structure to determine the file type. This file type is returned by Libmagic as a descriptive string, which then may be parsed to place the file in a hierarchal category. An embodiment may create a category for each 'new' type of file encountered in the training set.

The second phase commences once the space of training files is partitioned 202 into appropriate categories. Individual category-specific classifiers are then trained to distinguish between benign and malicious software within the corresponding category (block 204). In our case, embodiments gather a collection of training files of known class (benign or malicious), all from the same category of file (as determined by partitioning 202), which are used to train (or construct) 204 a training set for the category specific classifier as described in the following: the collection of files in each category undergoes n-gram feature selection and extraction analysis techniques, as discussed above, to construct binary feature vector representations of each file. Feature selection comprises evaluating features of all the files in the category to identify a subset of those that are the most effective at distinguishing between benign and malicious files. An embodiment of the training 204 uses information gain techniques to evaluate these features. As mentioned above, the features are n-grams, ordered sequence of entities (grams) of length n and a gram is a byte of binary data. The feature vector is an ordered list of ones and zeros indicating either the presence, or absence, of an n-gram within the file's binary representation. An embodiment of the training 204 may then use supervised machine-learning algorithms to train ada-boosted J48 decision trees on the training set. Experimentally it has been found that the predictive capacity of these category specific classifiers is greatly enhanced when operating on files of their own category, at the cost of substantial degradation when operating on files of a different category.

These category specific classifiers are then used to construct a composite classifier (block 206). The composite classifier includes three-operational components: a file categorizer, a classifier manifest and a collection of the category-specific classifiers. The classifier manifest maps the file categories to the category-specific classifiers.

With continuing reference to FIG. 2, the third and final phase includes receiving one or more target, unknown files for classification (block 208), initializing the composite classifier (block 210) and classification of target, unknown files via the composite classifier (block 212). During initialization 210 of the composite classifier, the classifier manifest is used to construct a map which connects the file categories with category-specific classifiers. When a received 208 target file is considered for classification the target file first undergoes categorization via the file categorizer, which may use the process described above in phase one to determine the file type and assign that file to a specific file category. After categorization, the classifier map is used to determine which category-specific classifier is applied to the target file. The determined category-specific classifier is applied to the target file. Once the category-specific classifier is finished, the method 200 returns the predicted classification (or probability that a file is malicious) to the composite classifier, which is in turn passed to a calling function or object.

Using method 200, embodiments provide an increased detection rate of a class matching system while simultaneously reducing the false alarm rate. A proof-of-concept composite classifier was constructed using four (4) category-specific classifiers (PDF, PE32 GUI, MS-DOS and PE32-DLL files) and a general classifier trained on a diverse set of files and intended to handle any file not allocated to one of the category specific classifiers. This composite classifier was run against 1.5 million files in a file repository of known malicious and benign files. This test demonstrated that a composite classifier significant increased accuracy versus a similar test run using a classifier that did not include any category-specific classifiers. Overall true positive detection increased from 80% to 90%. Overall false positive rate was reduced from 18% to 7%. Accuracy of detection also improved for the four (4) individual file categories. For example, true positive detection rate for PDF files increased from approximately 2% to 90% while maintaining a false positive rate of under 5%.

Embodiments of an improved system and method for automated machine-learning, zero-day malware detection also include an extensible feature vector generator (EFVG). An EFVG facilitates and manages the addition or removal of attributes, attribute classes, and corresponding feature derivation methods in a machine-learning system. A single attribute or set of attributes may be limited in discriminative power and, therefore, insufficient to adequately design a successful classifier. The use of diverse sets of attributes derived from a variety of attribute classes (e.g., for the case of automated malware detection, extracting n-grams, file-specific content, etc.) has been found to improve classification precision and recall. In embodiments, the EFVG provides a consistent, intuitive, and easily extensible framework for rapid testing, evaluation and incorporation of attributes and attribute classes for classification performance.

Current machine-learning packages or software tools do not make explicit the notion of the attribute class and they do not attempt to provide an extensible framework for deriving features for attributes. Instead, the generation of feature vectors is hard-coded into the system and any changes to the attribute list or to the mechanism(s) for feature derivation could, depending on the complexity of the changes, result in extensive, non-trivial changes to the code or architecture. Furthermore, hard-coding the generation of feature vectors without keeping track of the attributes that each feature corresponds to in a consistent fashion can be a dangerous practice, especially if the feature vector, or the nature in which it is used is inadvertently altered.

Moreover, with the current state of the art it is hard to incorporate features corresponding to new attributes. Typically, feature vectors for machine-learning are "hard coded," meaning that a specific method is tailored to generate the corresponding feature vector corresponding to an object depending on the attributes under consideration. The code for generating the feature vectors has to be changed with new mechanisms for deriving the corresponding features, and the length of the feature vector has to be manually adjusted to reflect this change. This is impractical for classification involving large numbers of attributes; especially if different attributes are used within the same classification mechanisms. For example, n-grams are best used for classifying PE32 executable files, whereas certain file characteristics are best used for classifying pdf files. It is cumbersome to integrate the two feature types into a single classifier. Adding new attributes further complicates the issue. Embodiments of the improved system and method for automated machine-learning, zero-day malware detection also include an EFVG overcome these issues.

In conventional machine-learning, a "feature" is defined as the particular value of an attribute of an object, where each attribute describes an aspect of the object we are attempting to classify (or of the world we are attempting to model). Each feature may be of some type (often referred to as the attribute type), usually binary or numerical. A feature vector is the set of features corresponding to pre-determined attributes that are specially selected for classification purposes. Another way of describing a feature vector is as a collection of attribute values (the features), corresponding to an object (e.g., a file), that is used in classification of that object. A feature vector generator (FVG) derives features (precisely, the values corresponding to the selected attributes) from an object and populates the feature vector with those features.

Typically, attributes are selected that show particularly high "information-gain" distinguishing between the set of objects to be classified (e.g., malicious vs. benign files). There are a number of standard mechanisms to derive the selected attributes. A model is learned from some collection of feature vectors representing that set of objects. The success of a machine-learning system for classification is usually dependent on the choice of attributes, the availability of feature vector instances, and the complexity of the selected model or learning algorithm. As a general rule, however, the more data that is available the better. The richer the set of attributes used the higher the likelihood of creating a successful machine-learning system.

Embodiments introduce "attribute classes" that categorize attributes into different classes, each class with a particular method for deriving or computing the features corresponding to that attribute. The "attribute classes" may be hierarchically organized. The process of identifying or deriving the feature (the value of the attribute) for a given attribute is distinct to an attribute class. For example, an attribute class may be n-gram, where the features are binary values recording the existence of a particular n-gram in a file. These features are best derived via a tree-based search algorithm (e.g., Aho, Alfred V.; Margaret J. Corasick (June 1975). "Efficient string matching: An aid to bibliographic search". *Communications of the ACM* 18 (6): 333-340). Subclasses of the n-gram attribute class include 4-grams, 6-grams, and 10-grams. Other attribute classes may be file size and may involve numerical calculations to derive the features.

Embodiments also introduce an "extended feature vector" (EFV) that comprises the features of an object (e.g., a training or target file) that correspond to these different attribute classes. An EFV may be a concatenation of a number of feature vectors corresponding to different types of features (e.g., in embodiments, n-grams, pdf-objects, pe32 objects, etc.). In embodiments of an improved system and method for automated machine-learning, zero-day malware detection, the EFVG provides a consistent framework for generating EFVs by providing a common interface for (a) specifying new attribute classes and (b) for adding a mechanism for deriving the features corresponding to the attribute class. In an embodiment, the EFVG draws upon individual FVGs to generate feature-type-specific feature vectors and then concatenates these feature-type-specific feature vectors into an EFV.

Figure 3:
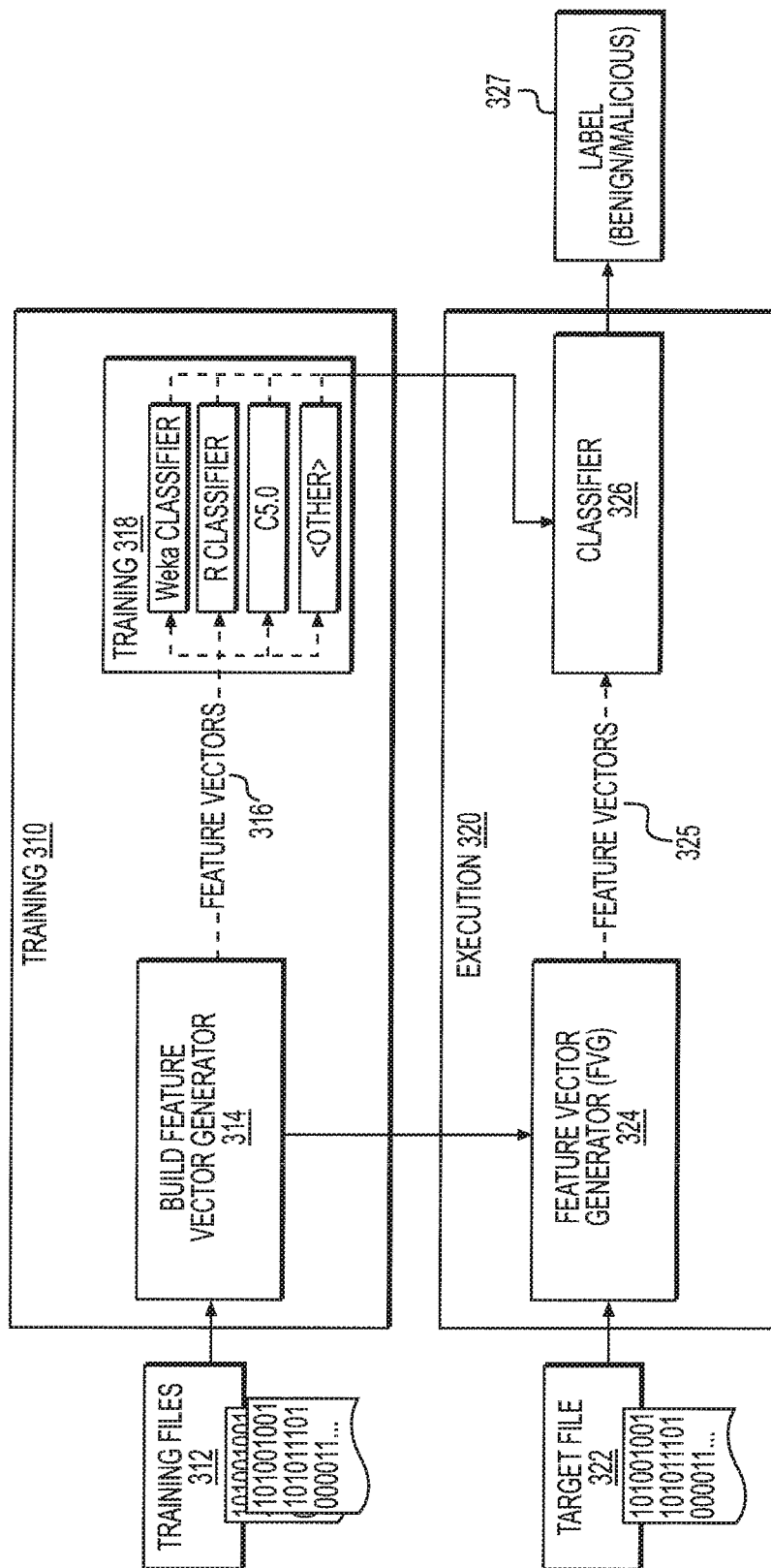
FIG. 3 is a block diagram illustrating an embodiment of a system and method for automated machine-learning, zero-day malware detection.

With reference now to FIG. 3 shown is an embodiment of a system 300 for automated machine-learning, zero-day malware detection that relies on a basic machine-learning system. System 300, which may also be referred to as a malware detector pipeline, includes a training component 310 and an execution component 320. Training component 310 builds classifier from a set of training files 312 (e.g., training repository 102 from FIG. 1). Training files 312 include known malware files and known benign files. A FVG 314 analyzes the training files 312 and produces training feature vectors 316. Supervised machine-learning algorithms are then applied by trainer 318 to the training feature vectors to build classifier 326, such as ada-boosted J48 decision trees, used in execution component 320. Execution component 320 receives target file 322, analyzes target file and generates feature vectors 325 with FVG 324 (which may be same FVG used in training component 310) and analyzes generated target file feature vectors with classifier 326. Classifier 326 outputs a benign or malicious label 327 for the target file based on this comparison. As described above with reference to FIG. 1, this output may include a calculated percentage likelihood or confidence level that target file is malicious (or benign).

Figure 4A:
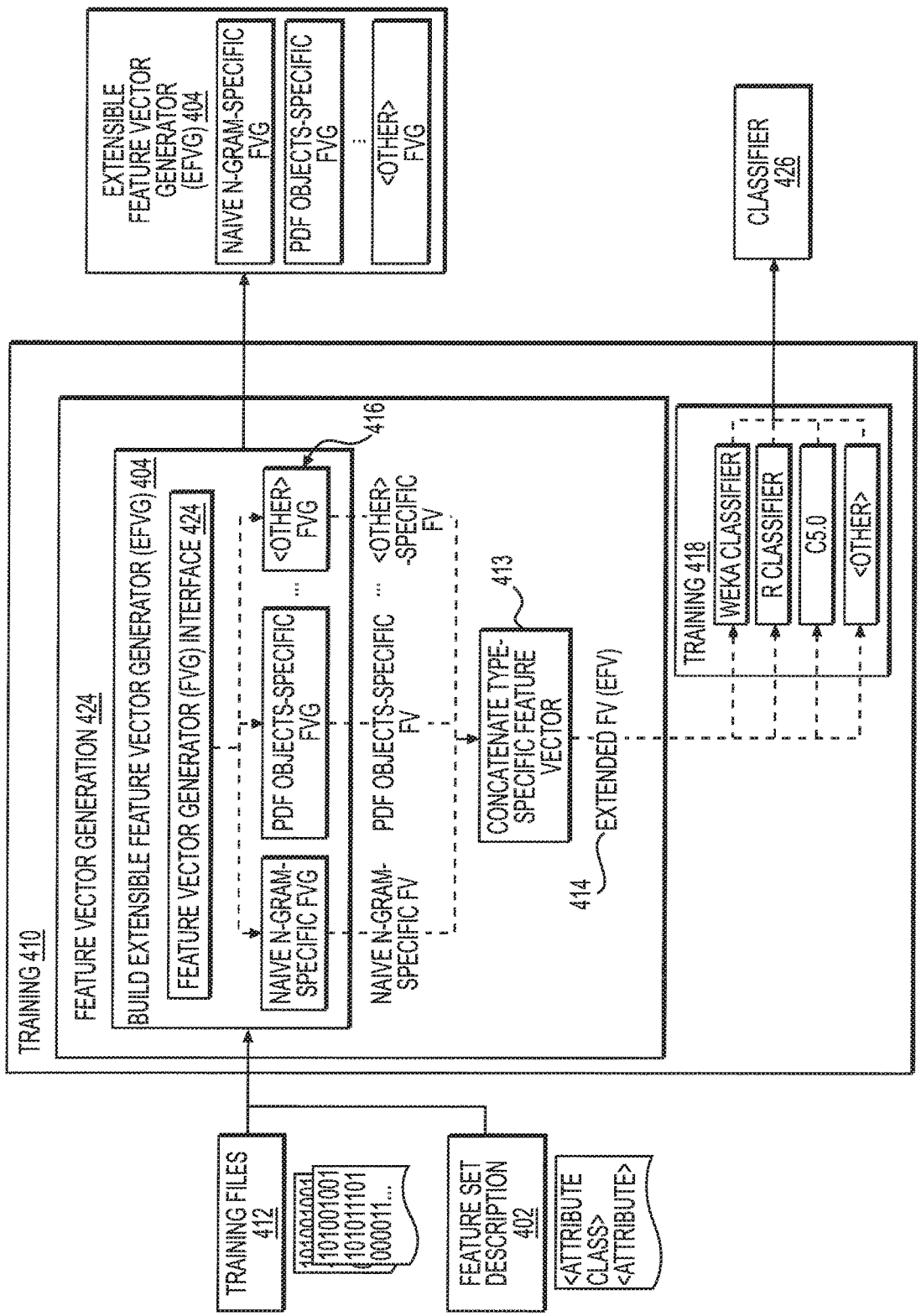
FIGS. 4A and 4B are block diagrams illustrating embodiments of an improved system and method for automated machine-learning, zero-day malware detection utilizing an extensible feature vector generator (EFVG).
Figure 4B:
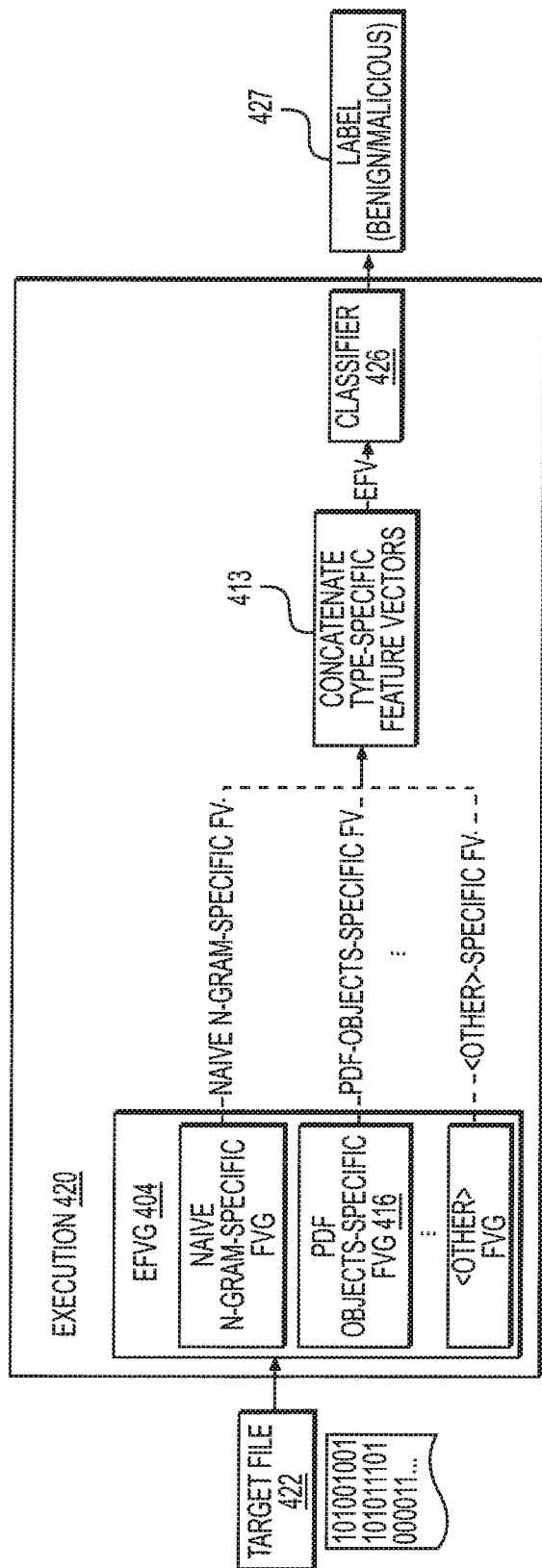

With reference now to FIGS. 4A and 4B, shown is an embodiment of an improved system 400 for automated machine-learning, zero-day malware detection that incorporates an EFVG. Embodiments of system 400 operate by adding two components to the basic machine-learning system:

1. A supplementary feature set description file 402 that, in no particular order, lists the semantic label or descriptive representation of an attribute and a specified computer-represented attribute class to which it belongs; —this mapping is generally determined once by a human user; and 2. An extensible feature vector generator superclass 404 (for any object-oriented programming language) that provides a method for:

a. Parsing the supplementary feature set description file 402 and creating a data structure comprising, for each attribute class, the attributes and their associated values as key-value pairs; and b. Computing the extended feature vector for a target object, given semantic labels corresponding to the attribute class and the mechanism by which the features are derived.

In embodiments, there is one (1) FVG per attribute class and the EFV is constructed by concatenating the feature vectors corresponding to the individual attribute-classes. As shown in FIG. 4A, training component 410 receives training files 412 and supplementary feature set description file 402 and uses EFVG 404 to build training EFVs 414. The EFVG 404 includes attribute class-type FVG 416, including a naïve n-gram-specific FVG, a PDF objects-specific FVG, and other FVGs. FVGs 416 may each include a type-specific algorithm indicating input variables (the file), output variables (the attributes) and the mechanism from which the output is derived from the input (e.g., Aho-Corasick pattern matching). Different FVs will use different algorithms for their construction, so the algorithms are type-specific to the FV. EFVG 404 concatenates the type-specific feature vectors 413 into the training EFVs 414. Trainer 418 builds classifier 426 from training EFVs 414. With reference to FIG. 4B, execution component 420 utilizes EFVG 404 to analyze target file 422. If multiple feature vectors are generated for a target file (e.g., an n-gram FV and a pdf objects FV), EFVG 404 concatenates the type-specific feature vectors 413 and classifier 426 analyzes this concatenated feature and outputs a benign or malicious label 427 for the target file based on this comparison. As described above with reference to FIG. 1, this output may include a calculated percentage likelihood or confidence level that target file is malicious (or benign). The EFVG 404 may be re-used during testing and prediction (classifying).

As indicated in FIG. 4A-4B, EFVG 404 provides a consistent reusable framework for adding new attributes, attribute classes, and feature derivation routines. In embodiments, this framework does not rely on any particular ordering of the attributes or attribute classes within the supplementary feature set description file 402, since they are parsed and organized internally prior to feature vector generation. Adding the supplementary feature set description file 402 and feature vector generator objects 416 alleviates the problem of extensive re-architecting and re-coding feature vector generation and obviates any inadvertent alteration of the derived feature.

Figure 4C:
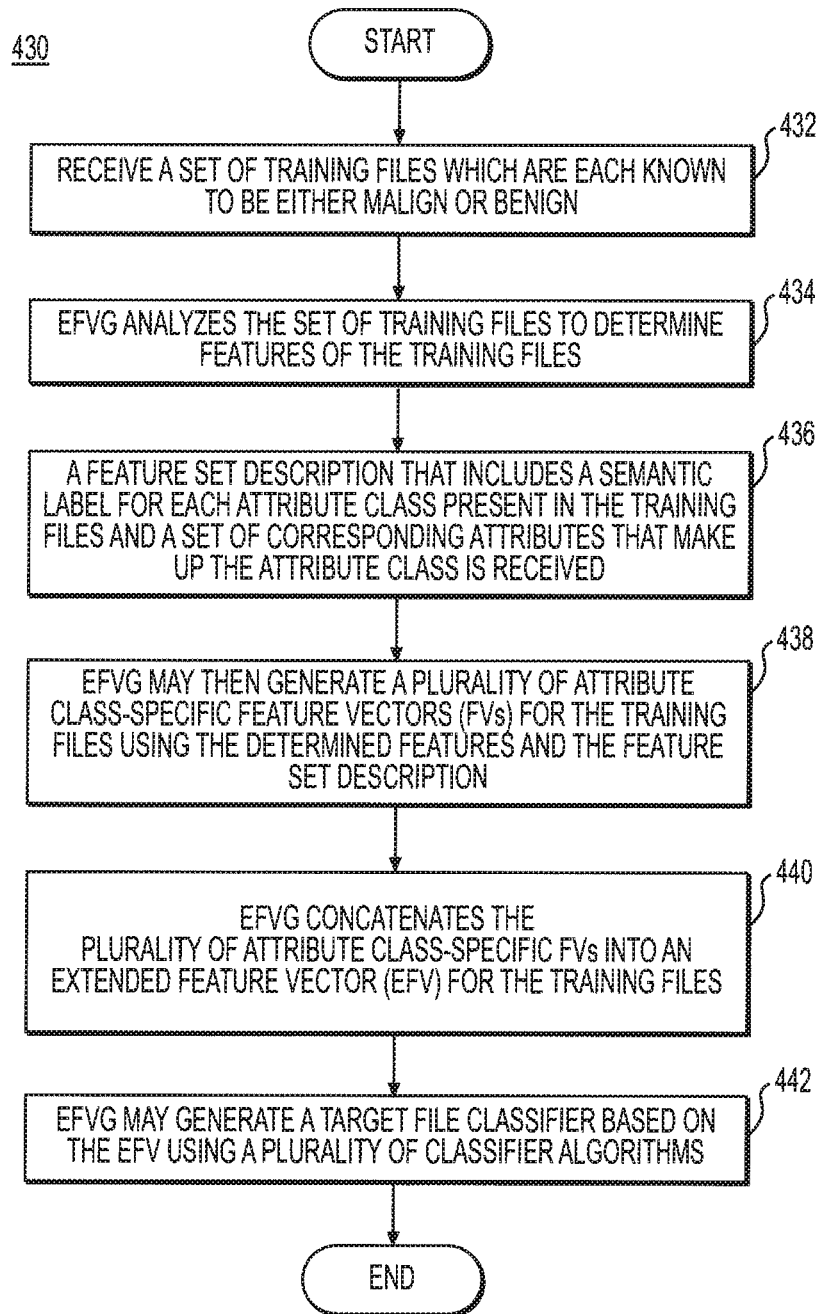
FIG. 4C is a flowchart illustrating an embodiment of an improved method for automated machine-learning, zero-day malware detection utilizing an EFVG.

With reference now to FIG. 4C, shown is an embodiment of a method 430 for improved zero-day malware detection that utilizes EFVG. As shown, method 430 receives a set of training files which are each known to be either malign or benign (block 432). EFVG analyzes the set of training files to determine features of the training files (block 434). A feature set description that includes a semantic label for each attribute class present in the training files and a set of corresponding attributes that make up the attribute class is received (block 436). EFVG may then generate a plurality of attribute class-specific feature vectors (FVs) for the training files using the determined features and the feature set description (block 438). The FVs are vectors of features present in malign files of the attribute class. EFVG concatenates the plurality of attribute class-specific FVs into an extended feature vector (EFV) for the training files (block 440). EFVG may generate a target file classifier based on the EFV using a plurality of classifier algorithms (block 442).

With continuing reference to FIGS. 4A-4C, during training, a classifier can be presented with any combination of attribute classes, comprising any number of attributes. Concretely, for every attribute class $f_i$, i=1, 2, . . . m, there is a list of corresponding attributes $\{a_1, a_2, \ldots a_{N_i}\}$, where m: # of considered attribute classes and $N_i$: # of attributes corresponding to the $i^{th}$ attribute class. This data can be presented in many ways. Two possible methods are:

Files: these can be .csv, .tsv, .txt, .arff, etc. which must then be parsed

Key-value pair containers with keys referring to attribute class, and values referring to a list of attributes.

One particular way of representing the attribute classes and attributes is through the "attribute-relation file format" (.ARFF file). The .ARFF file is a ASCII text file that describes a list of instances sharing a set of attributes, developed by the Machine-Learning Project at the Department of Computer Science of the University of Waikato for use with the open source WEKA machine-learning software. An embodiment of the improved system and method for automated machine-learning, zero-day malware detection including an EFVG may modify the .ARFF file format and use the modified .ARFF file to present the attribute data. The attribute-relational file format contains three sections, marked by the three words @relation, @attribute and @data. The @relation section provides meta-data information about the file and the dataset, the @attribute section contains a list of the semantic labels of the attributes and corresponding attribute type (numeric, string, etc), and finally, the @data section contains a feature vector corresponding to the attributes listed in the @attribute section. An embodiment of the improved system and method for automated machine-learning, zero-day malware detection including an EFVG adds a comment to each line of each attribute, denoting the "attribute class," i.e., the type of feature to which the attribute pertains. Alternatively, attribute may include dedicated field for the attribute class so that attribute class is not included in the comment field. This comment field may be used by the EFVG to identify the mechanism to be used to calculate the value (i.e., the feature) corresponding to this attribute. By including this comment, the attribute-relational file can be parsed to create a data structure that holds key-value pairs of attribute classes and sets of attributes comprising that class. Once this data structure is constructed, all feature vectors can be generated consistently. Moreover, by including this comment, the order of attributes can be arbitrary and new additions require minimal effort to change within code. Further, this comment makes transparent which attribute belongs to what attribute class. The current .ARFF file format, without this comment, would require the order of attributes in the @attribute section to be kept constant in order to avoid extensive code changes and would make it difficult to tell which attribute belongs to which class.

Figure 5:
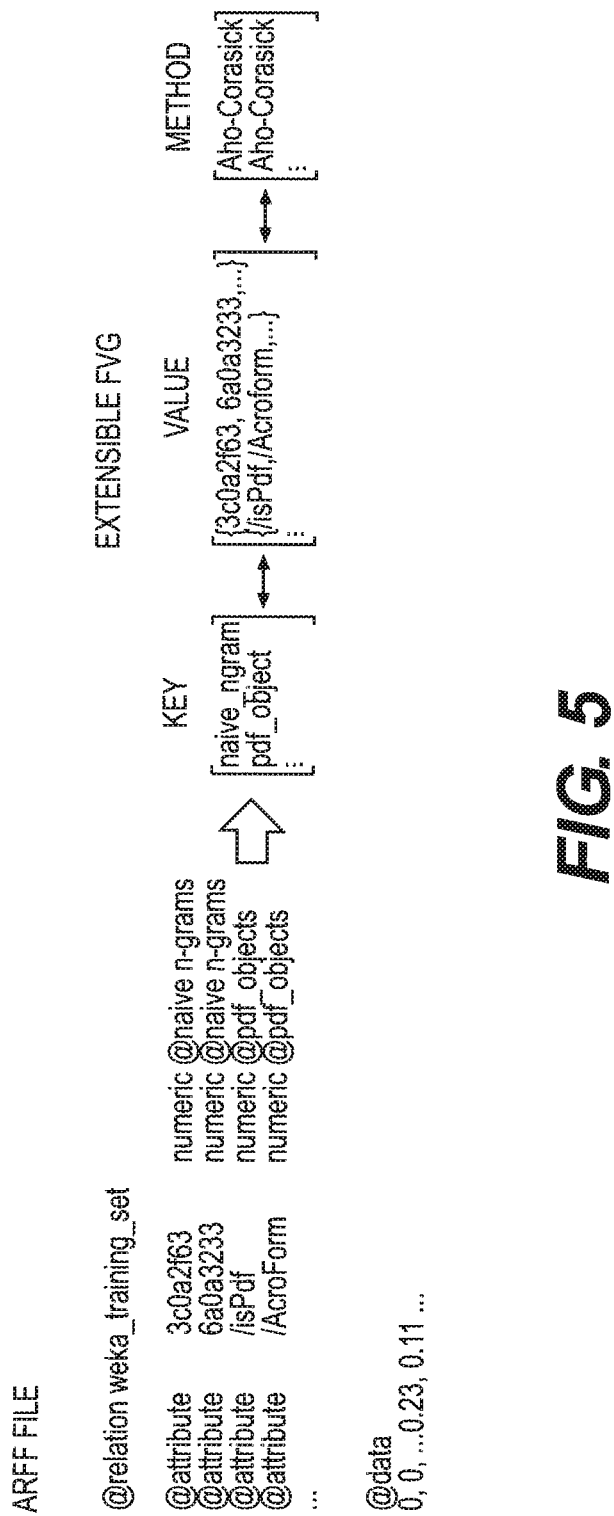
FIG. 5 is a diagram illustrating an extensible feature vector (EFV) used in an embodiment of an improved system and method for automated machine-learning, zero-day malware detection utilizing an EFVG.

As noted above, the EFVG provides a consistent framework to take any combination of attributes from a variety of attribute classes to construct an extended feature vector. Embodiments reorganize each file (or data structure) internally into "feature-type"—"set of attributes" key-value pairs, and stores the method for deriving the features for the attributes corresponding to a given attribute class in the EFVG. FIG. 5 provides an illustration of this process.

It is also noted that embodiments of the EFVG are particularly useful in implementing the improved system and method for automated machine-learning, zero-day malware detection that provides a composite classifier useful for malware detection as described above with reference to FIG. 2. Embodiments of the improved system and method that that provides a composite classifier useful for malware detection may use a wide variety of EFVs depending on the particular file types considered.

Embodiments of an improved system and method for automated machine-learning, zero-day malware detection include a qualified meta-features (QMFs) feature extraction algorithm for increasing accuracy and reducing "false positive" errors of automated malware detection systems. QMF extraction supports machine-learning systems that learn classes of malware by example and that extract features to build decision models that automatically recognize malware, such as the embodiments described herein. Most feature extractors for malware systems merely extract n-grams and use those counts as features. QMF extraction surpasses those systems by fully qualifying the features in terms of function and architecture, transforming ordinary features into qualified meta-features.

Embodiments of an improved system and method for automated machine-learning, zero-day malware detection that includes QMF extraction enhance the feature-extraction mechanisms employed by automated malware detection systems to increase the specificity or precision of the system while also boosting the specificity or recall. In other words, embodiments will classify true malware more accurately, while committing fewer errors of mistaken identity ("false positive" errors). Embodiments using QMF extraction may operate in a way similar to other machine-learning based malware detectors, such as those described above or in Kolter-Maloof, by extracting byte-code patterns (n-grams) from examples of malicious and benign (non-malicious) files in a training set.

In other words, embodiments utilizing QMF extraction may operate like other machine-learning malware detectors, using 'learning by example' to find salient byte-code sequences which implicate malicious behavior. However, unlike other detectors, QMF extraction further qualifies these salient features with unique tags which strengthen the confidence of the implications and reduce false alarms. In embodiments, QMF extraction further qualifies each byte-code pattern extracted by the patterns purpose or location in the file from which it is extracted. This qualification provides an additional context for conditioning the machine-learning models used by such embodiments, enhancing accuracy and reducing false alarms caused by contextual errors in interpreting the patterns. One aspect of novelty of the embodiments utilizing QMF extraction is in how the integration of salience and qualification takes place.

To extract or derive QMFs, embodiments draw upon additional metadata about the file that describes the type of file and layout of the file's major components. The file-type and components serve as additional context for detecting malicious files using qualified pattern features. The components used to qualify QMF feature sets depend on the file type of the example being used for training.

For example, two of the most common file formats involved in malware exploits are Window Portable Executable 32-bit (PE32) and Adobe Portable Document Format (PDF). Consequently, features derived from each of these formats are qualified by location and function according to the layout of the major components of each file type.
Specifically:
For PE32:
Qualified by location: Headers, Dictionaries, Sections, "gaps"
Qualified by function: Code and Data
For PDF:
Qualified by location: Header, Cross-Reference Index, Embedded file
Qualified by function: Form, Execution Action
For unknown files: default to Boolean feature, n-gram present (or not):
Qualified by location: {QMF value=1 if present, else 0}
Qualified by function {QMF value=1 if present, else 0}
In an embodiment, specific QMF tags for the PE32 format are shown in the following lookup table of representative QMF tags:

| QMF Tag: | Description |
| --- | --- |
| 0: | Pattern not present (Boolean) |
| HDR: | Part of header |
| CODE: | Part of executable code section |
| DATA: | Part of data section |
| IAT: | Import Address Table |
| DIR: | A "directory" pointed to from header |
| Z: | Anything that can't be classified to one of the above |

These tags are intended to define long contiguous regions within each file, in which major sections of header, code and data reside. By adding the 'Z' tag, all bytes in each file can be accounted for (even if not recognized).

The definitions are applied while searching each training file and extracting byte-patterns. When a salient byte pattern is found, its offset in the file is used to determine the appropriate QMF tag from a mapping table, such as the one below, which may be produced in a pre-preprocessor that scans every PE32 file prior to pattern extraction. Consequently, the offsets may vary from file to file.

| OFFSET IN File: | QMF TAG |
| --- | --- |
| 60: | HDR |
| 176: | HDR |
| 200: | HDR |
| 228: | HDR |
| 296: | HDR |
| 424: | DIR |
| 464: | HDR |
| 504: | HDR |
| 544: | HDR |
| 584: | HDR |
| 1024: | z |
| 14341: | z |
| 14381: | IAT |
| 14848: | CODE |
| 20145: | z |
| 51856: | DATA |
| 86528: | z |

The qualification then proceeds by applying the QMF tag for the current offset in the file to the extracted pattern. In embodiments, the QMF tagging may take place in one of two essentially equivalent ways:

Features can be 'qualified' by "prefixes" or "feature value" that denote the functional context of the feature, consequently reducing errors caused by contextual mismatches. For example, an n-gram prefix may denote function or location, e.g.:

"76616c69"=>C76616c69 (qualified by function: "code");
"76616c69"=>D76616c69 (qualified by function: "data"); and
"76616c69"=>H76616c69 (qualified by location: "header"); or If mutual exclusion can be applied, the QMF tag can be an n-gram "feature value," e.g.:

"76616c69"=>{C,D,H} (qualified by value, according to function or location).

The resulting QMF qualified features (extracted features tagged with QMF tags) may then be used as feature vectors, replacing the Boolean-valued feature vectors normally employed for this purpose. QMF extraction and the QMF tag does not interfere with the effectiveness of the extracted features. All byte codes extracted from the same kind of string data will have the effectiveness as before. QMF extraction eliminates accidental matching with features that are not string features, therefore reducing the false alarms and other misclassifications. QMF extraction also permits low-entropy features (e.g., 0x00000000) which normally are useless for malware detection to have increased classification power.

Figure 6:
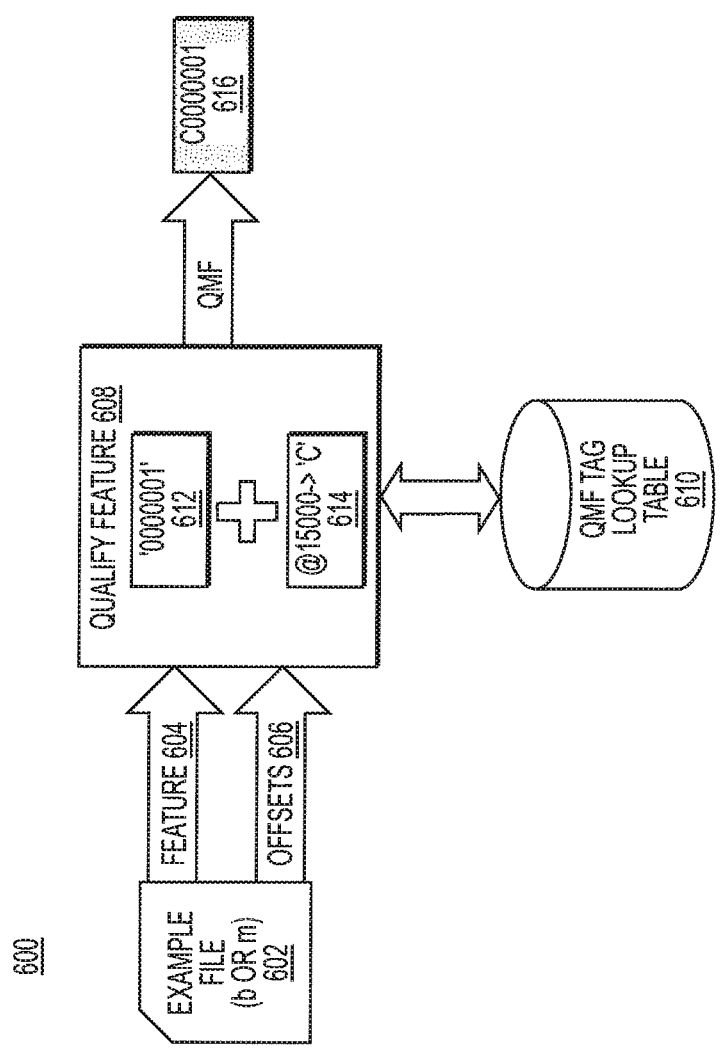
FIG. 6 is a diagram illustrating an embodiment of an improved system and method for automated machine-learning, zero-day malware detection using qualified meta-features (QMF).

With reference now to FIG. 6, shown is an embodiment of an improved system and method 600 for automated machine-learning, zero-day malware detection that includes QMF extraction. In embodiment shown only a portion of system 600 is shown, specifically QMF extraction portion. In an embodiment, an example file 602, which may be benign (b) or malign (m), is analyzed. A feature 604 and a feature offset 606 are extracted from file 602. Embodiments also pre-process the example file 602 to determine the offsets for each component of the file 602 and to generate a mapping table, as described above. Qualifier 608 qualifies the extracted feature 604 by determining the location of the feature 604 from the feature offset 606 and determining the appropriate tag from the mapping table (not shown) and a QMF tag lookup table 610. In the embodiment 600 shown, the extracted feature 604 is "0000001" 612 and the offset is @15000 614. From the mapping table shown above, 15000 falls in the range of 14848 to 20144. Consequently, the extracted feature 604 is part of the executable code section of example file 602. Qualifier 608 qualifies or tags extracted feature 604 with QMF tag for code (e.g., "C") and outputs QMF "C0000001" 616.

Figure 7A:
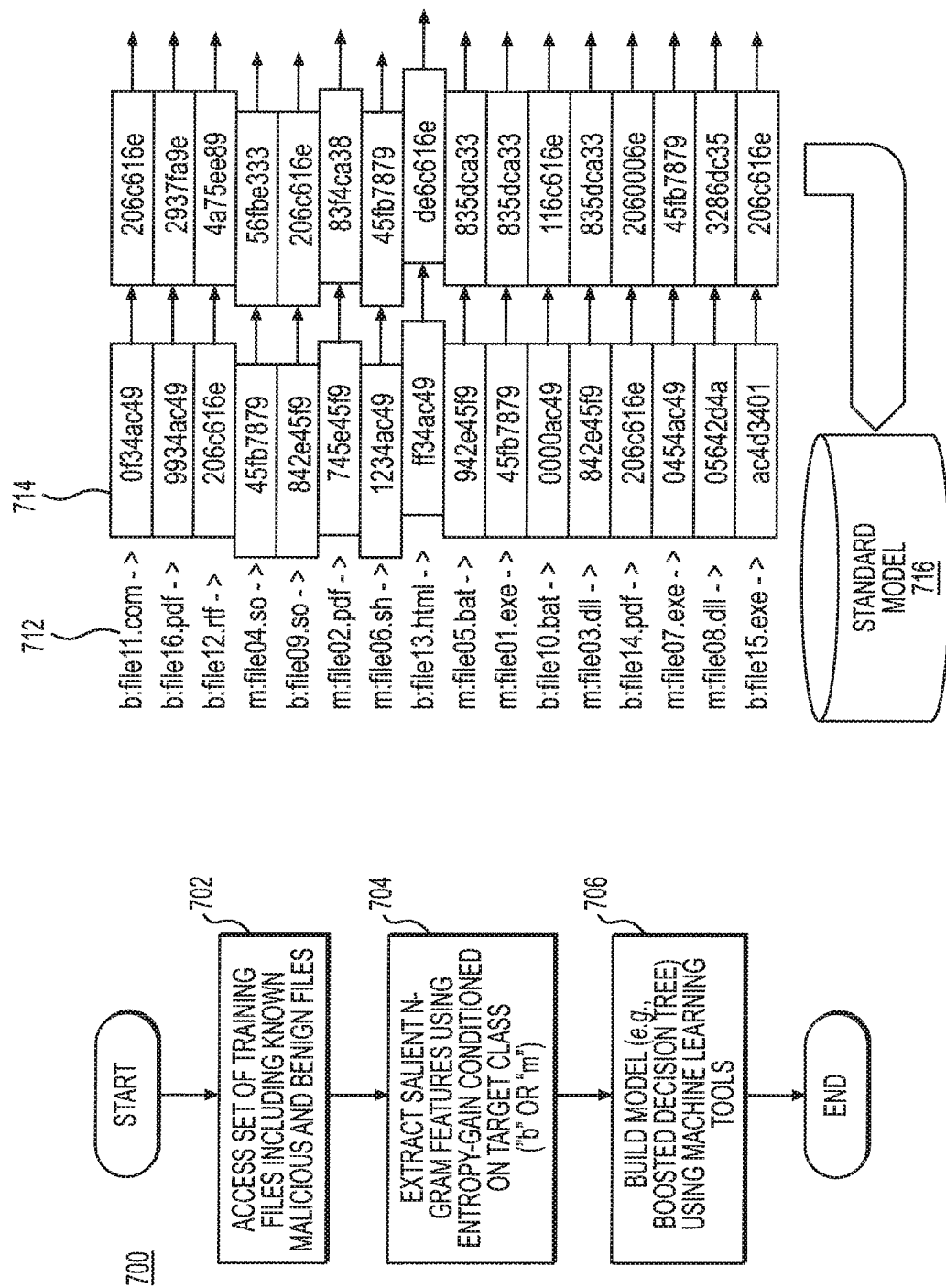
FIG. 7A is a flowchart and diagram illustrating an embodiment of a system and method for automated machine-learning, zero-day malware detection not using QMF.

With reference to FIGS. 7A and 7B, shown is a comparison of a malware detection using non-qualified features, such as described in Kolter-Maloof, and QMF as in the embodiment described here. As shown in FIG. 7A, method 700 of malware detection using non-qualified features accesses training set of known malicious (m) and benign (b) files 712 (e.g., training repository 102) (block 702), extracts salient n-gram features 714, e.g., using entropy-gain conditioned on the target class (block 704), and builds a model 716 (e.g., a boosted decision tree) using machine-learning tools (block 706). As shown in FIG. 7B, method 750 using QMF features accesses training set of known malicious (m) and benign (b) files 712 (e.g., training repository 102) (block 752), extracts QMFs 764, e.g., extracts salient n-grams using entropy-gain conditioned on the target class and adds QMF attribute or tag (block 754), and builds a QMF model 766 (e.g., a boosted decision tree) using machine-learning tools (block 756). In FIG. 7B, the added qualified meta features are indicated by shading (i.e., stipling) and hatching the corresponding features. If a feature is shaded, it occurs in a particular section of the file (say DATA). If a feature is hatched, it occurs in a different section of a file (say CODE). The hatching and shading serves as a graphical representation that a feature may occur in more than one context in the file. A representative mechanism implementing the QMF may, for example, append the feature with an additional 2-byte sequence representing the context of the file in which the feature is observed. The "Standard" Kolter-Maloof (non-improved) as seen in FIG. 7A has no hatching at all, as it does not qualify the n-grams with additional features. For example, in method 750, the feature "45fb7879" occurs twice in shade and twice with cross-hatching in FIG. 7B, indicating that this feature occurs in two different uses in the file. In a representative implementation of the mechanism, the feature 45fb7879 may thus be tagged and represented as CODE45fb7879 and DATA45fb7879, if it occurs in CODE and DATA sections of the file, respectively. There are many other ways, such as key-value pairs, to assign the tags to the features, thereby creating the qualified meta-features. Features shown in embodiment of method 700 in FIG. 7A are purely binary (i.e., not multi-valued). In method 700 a feature is coded as "1" if it is present in the file. In both method 700 and method 750, a feature is coded as "0" if the feature is not present.

By using QMF tags that indicate what section of a file a feature is extracted from, the same feature (e.g., n-gram value 00000001) can be used to qualify more than one class (e.g., both benign and malign files) or different types of files (pdf and PE32).

Using QMF extraction provides many advantages, as described above. Compare to an automated machine-learning, zero-day malware detection utilizing Boolean n-gram features without QMF:

Boolean n-gram Features
  Simple and robust because it makes no assumptions about the function or location of an n-gram ("architecture-free");
  Susceptible to false-negatives because the n-grams detected tend to be very rare (and therefore carry high entropy-gain); and
  Will not detect very common (low-gain) n-grams (e.g. 0x00000000,0xffffffff) because they serve many different functions.
Qualified Meta-Features (QMF)
  Meta-Features qualified by function or location, therefore it is architecture-dependent
  This qualification, however, makes it possible to recognize malicious byte-patterns with very low entropy-gain.
  QMF should be able to recognize, for example, malicious n-grams with the pattern 0x00000000, given discriminating qualification.

Testing of embodiments of improved system and method for automated machine-learning, zero-day malware detection using QMF have shown improvements in accuracy and reductions in false alarm rates versus system and method for automated machine-learning, zero-day malware detection using Boolean n-gram Features without QMF.

Figure 8:
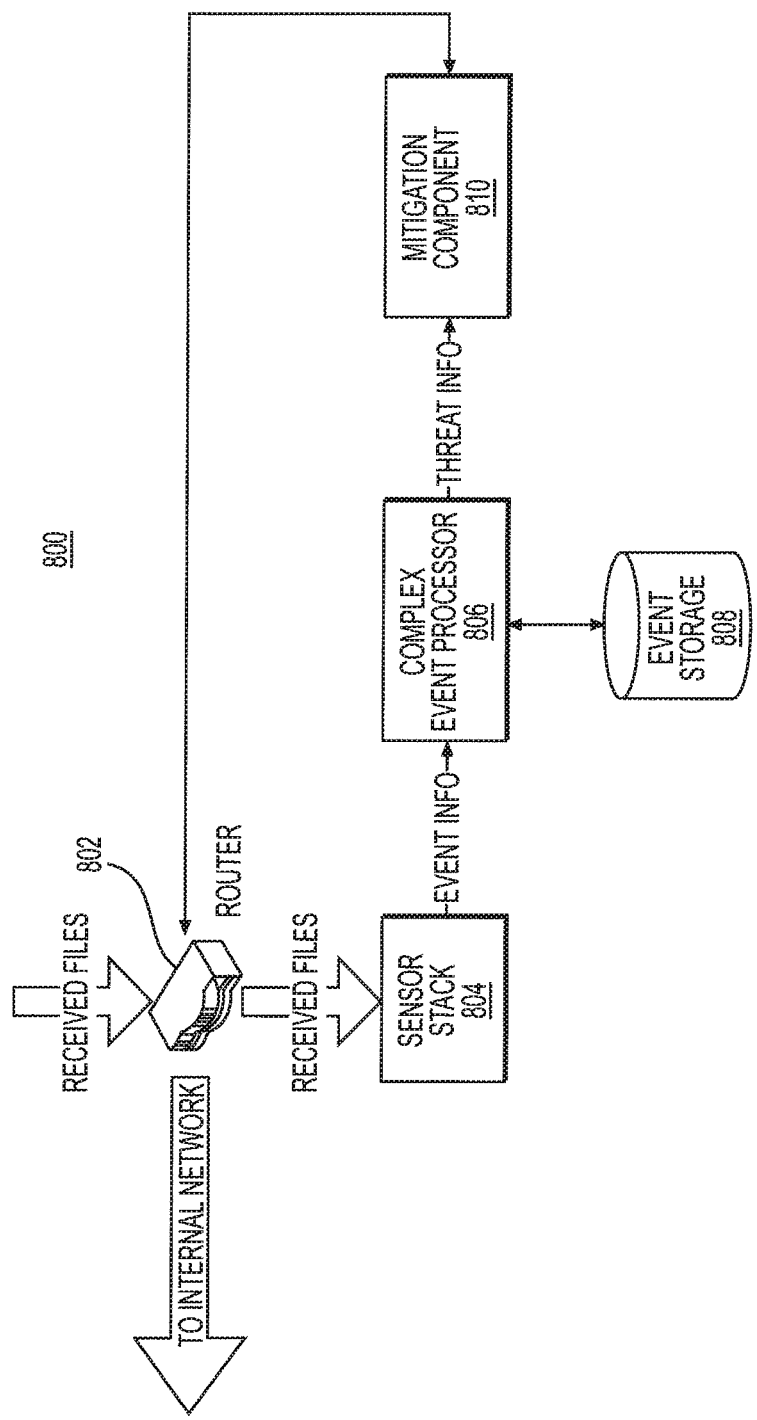
FIG. 8 is a block diagram of an embodiment of a system for malware detection and defeat utilizing embodiments of an improved system and method for automated machine-learning, zero-day malware detection described herein.

With reference now to FIG. 8, shown is an embodiment of a system 800 for zero-day security event detection and mitigation that may incorporate embodiments of improved system and method for automated machine-learning, zero-day malware detection described herein. Such a system 800 detects security events, such as malware or network intrusions, processes such events and issues commands aimed at mitigating such events. System 800 receives files from a router 802. System 800 may also receive attempted access information and other information relevant to determining whether a security event is occurring or has occurred. Specifically, sensor stack 804 receives such files and other security event information. Sensor stack 804 may include one or more sensors that incorporate or implement embodiments of improved system and method for automated machine-learning, zero-day malware detection described herein. Such embodiments may include improved system and method for automated machine-learning, zero-day malware detection including a composite classifier, EFVG and/or QMF. Sensor stack 804 may also include other security event sensors, including commercial-off-the shelf sensors. Sensor stack 804 outputs information indicating a detected security event to an analysis cell. Such security event information may include an output from one or more embodiments of improved system and method for automated machine-learning, zero-day malware detection described herein indicating a degree of likelihood that a received file is malware. Consequently, the security event information outputted will include an identification of the suspected malware file, the source of the suspected malware file and the calculated likelihood that the file is malware.

System 800 includes an analysis cell. Analysis cell includes a complex event processor (CEP) 806 and event storage database 808. Complex event processor 806 analyzes security event information received from sensor stack 804. For example, CEP 806 may analyze an indication of a degree of likelihood that a file is malware and the source of the suspected malware file. CEP 806 may implement a number of algorithms, including a reputation scoring algorithm and a probably next event algorithm. For example, CEP 806 may access information, from event storage 808, on past security events from the source of the suspected malware file. Other information about the source as well as the suspected malware file itself may be stored in event storage 808 or elsewhere and may be analyzed. Based on this information, CEP 806 may calculate a reputation score of the source and use that to make a determination whether the suspected malware file is actually malware and, therefore, is actually a security event. For example, if the source is a trusted partner of the entity implementing system 800 known to have good security measures, CEP 806 may give the source a high reputation score. This score may be used to determine that file does not represent a security event unless the likelihood that it is malware is sufficiently high. Additionally, if CEP 806 determines that the file represents a security event (it is malware), CEP 806 may calculate a probable next event based on past security events from source. This allows CEP 806 to instruct appropriate mitigation. CEP 806 may also calculate a security event threat level based on these calculations.

CEP 806 may store data on the suspected security event using key value in the event storage 808 to best enable the execution of CEP algorithms. CEP 806 may also receive follow-up data on post-mitigation (or non-mitigation) efforts to append to data about an analyzed and stored event. By storing data in event storage 808, CEP 806 may continually learn from security events (non-events) as they occur and are analyzed.

CEP 806 outputs security event threat information and mitigation instructions to mitigation component 810. In embodiments, mitigation component utilizes border-gateway protocol (BGP) messaging to mitigate determined security events and the effects thereof. CEP 806 may configure mitigation efforts and instructions for mitigation component 810 based on reputation scores and threat levels that it determines. Mitigation component 810 takes appropriate mitigation actions based on this information and instructions. For example, mitigation component may instruct router 802 to block all files and other access from identified source.

Figure 9A:
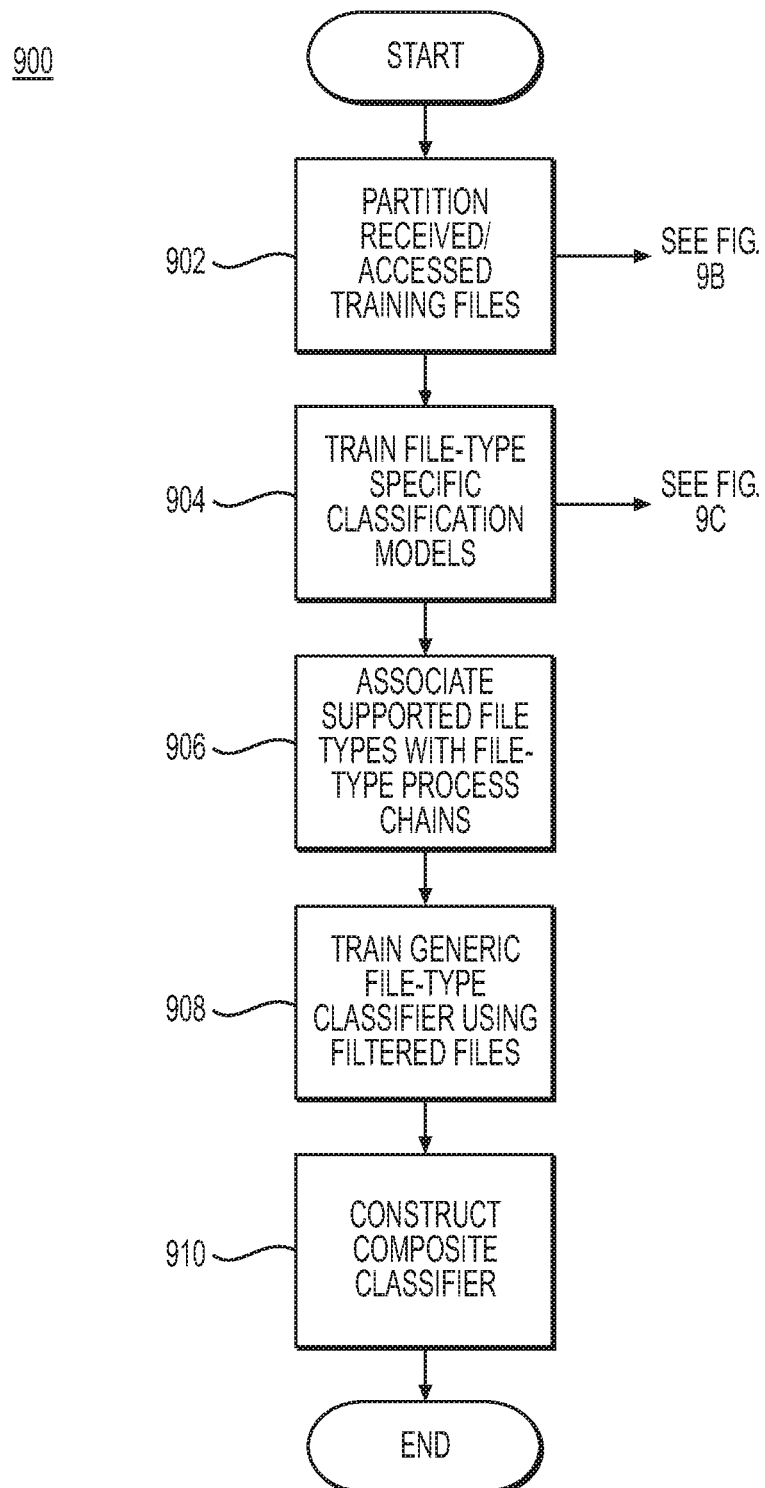
FIGS. 9A-9G are flowcharts illustrating embodiments of an improved method for detecting malware using multi-stage file-typing and, optionally, pre-processing, with fall-through options.
Figure 9B:
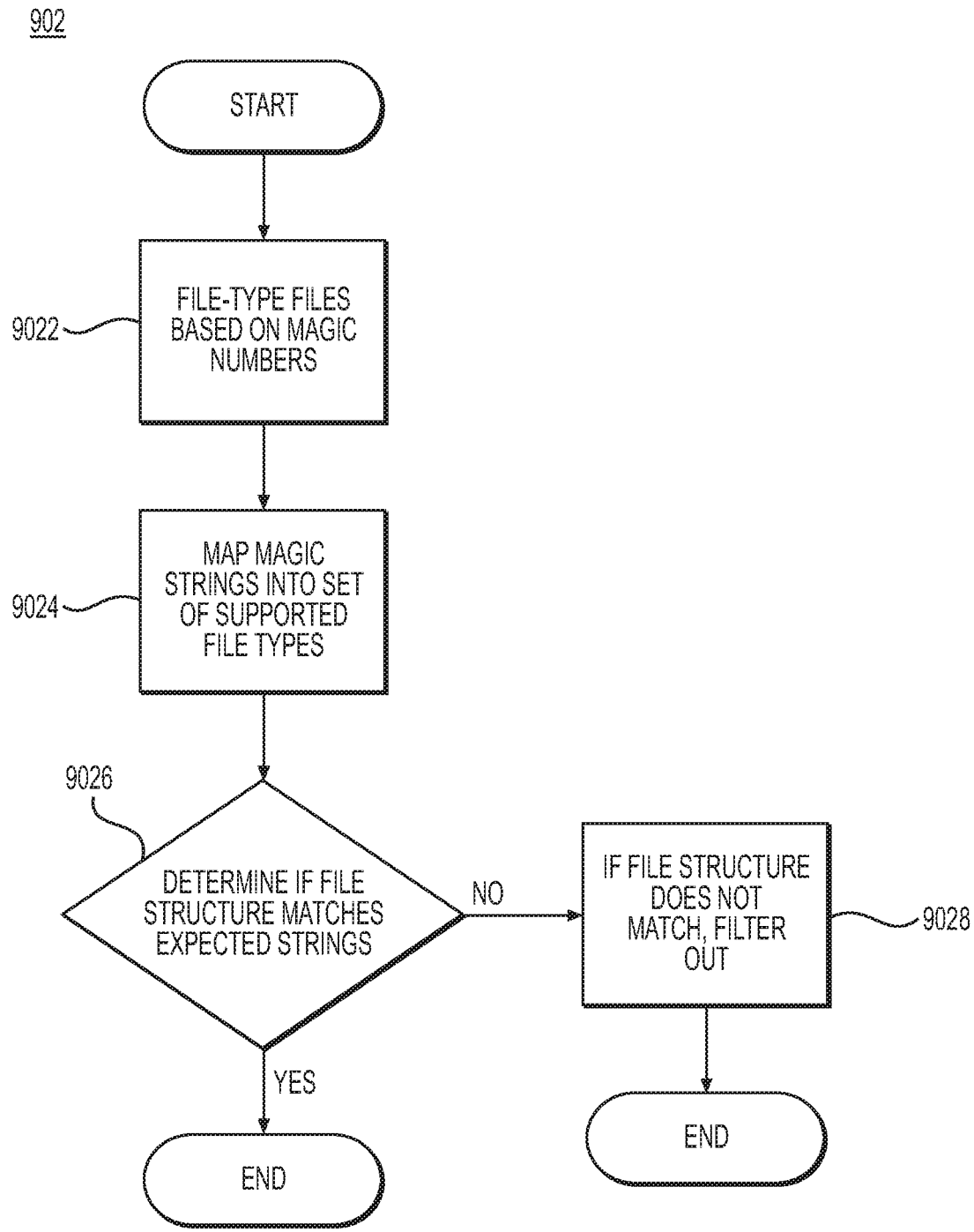
Figure 9C:
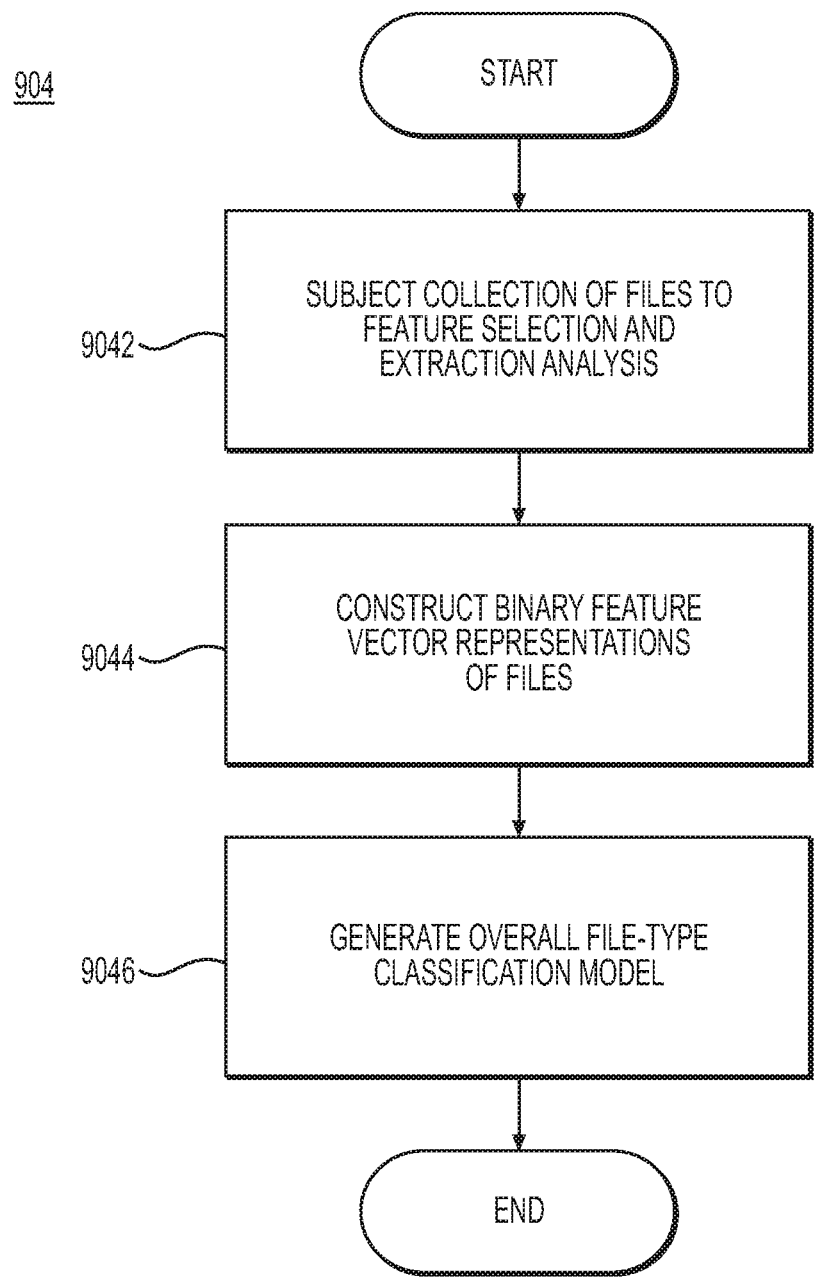
Figure 9D:
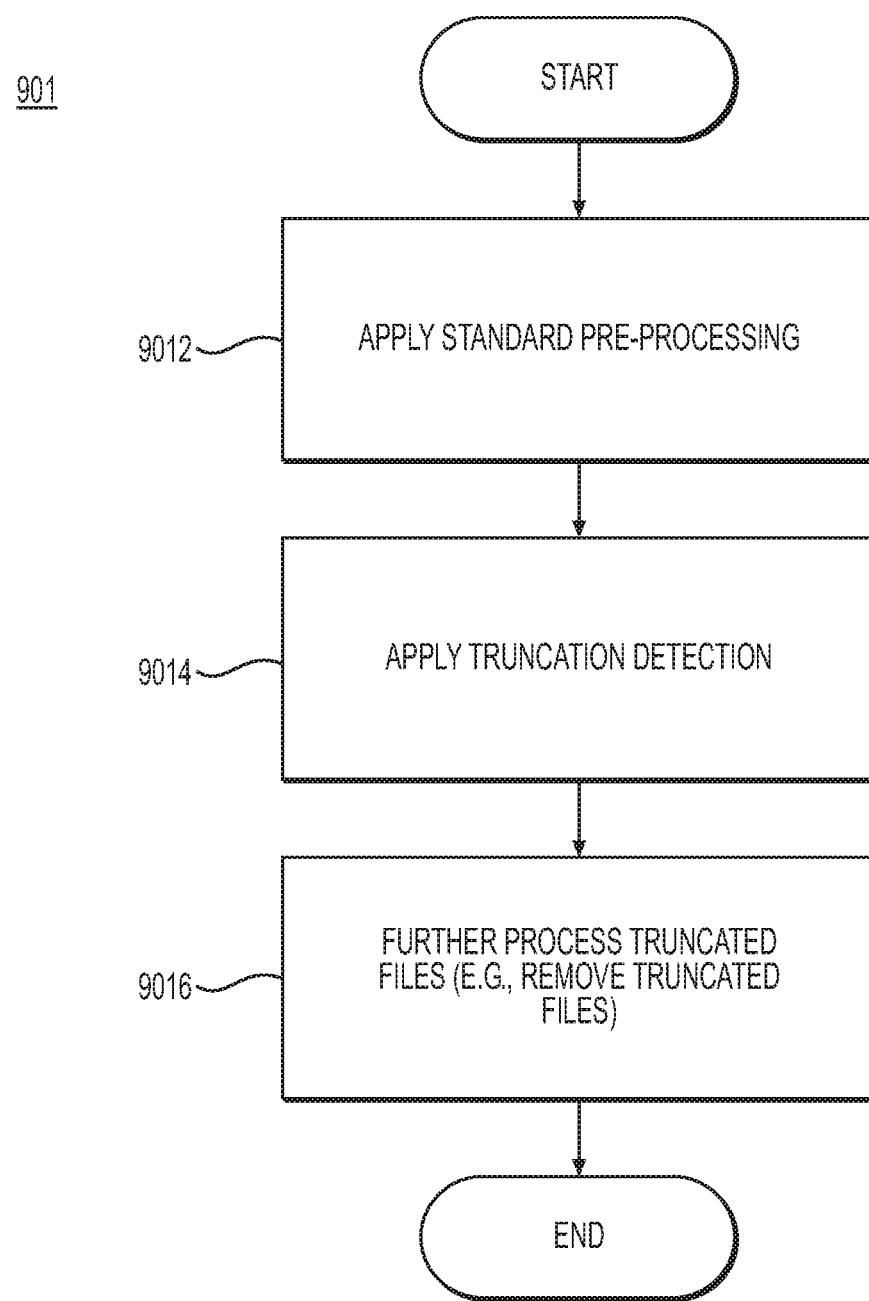
Figure 9E:
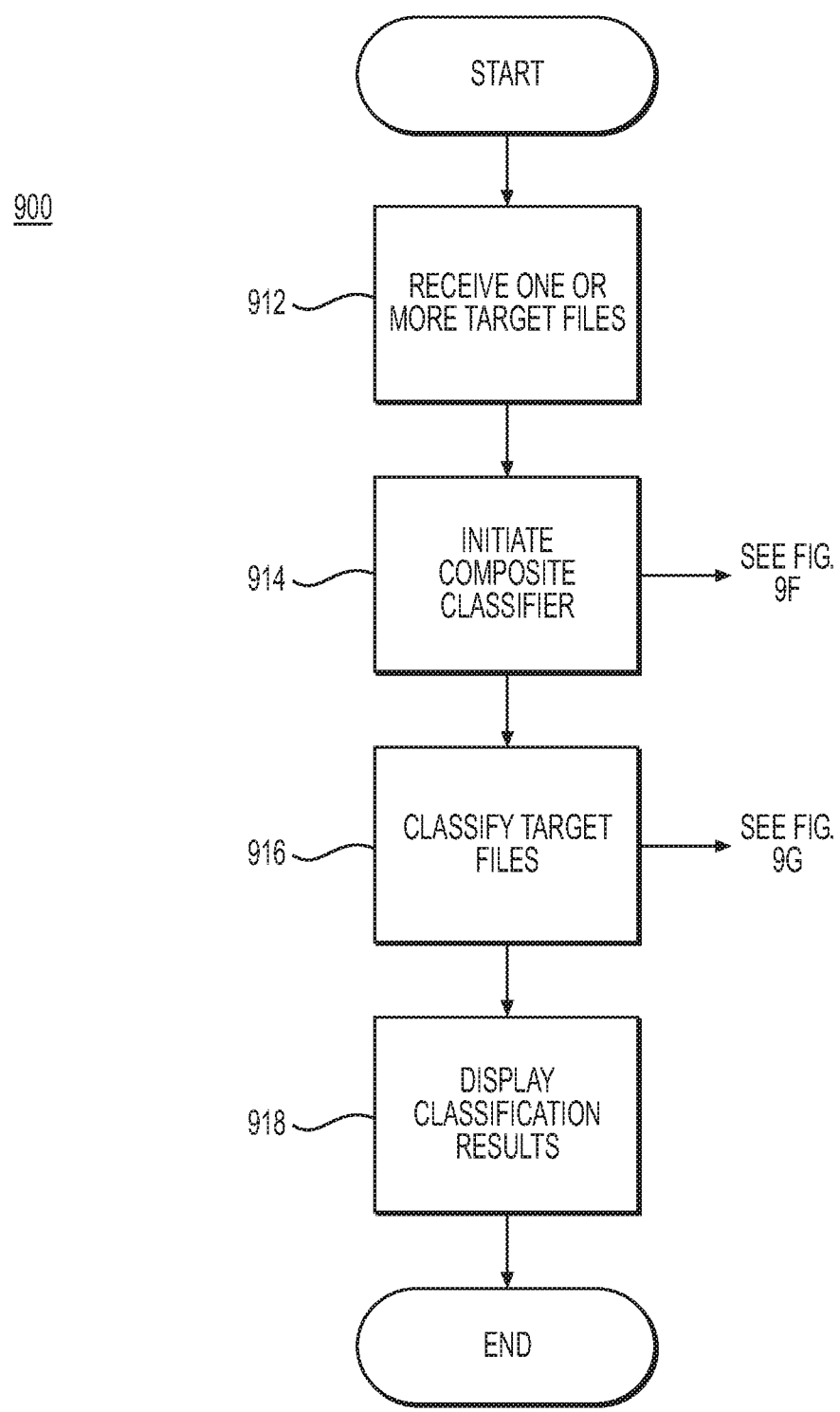
Figure 9F:
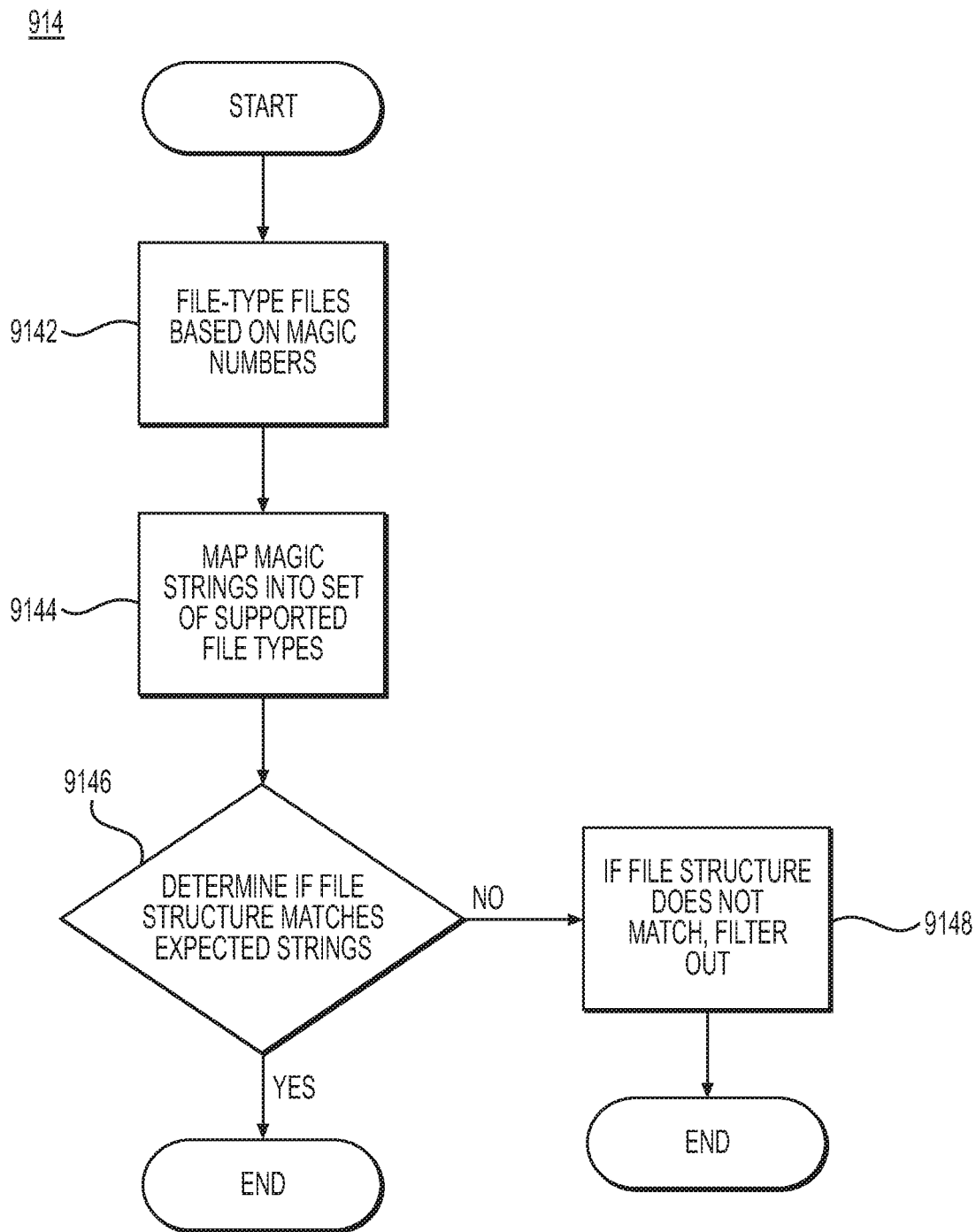
Figure 9G:
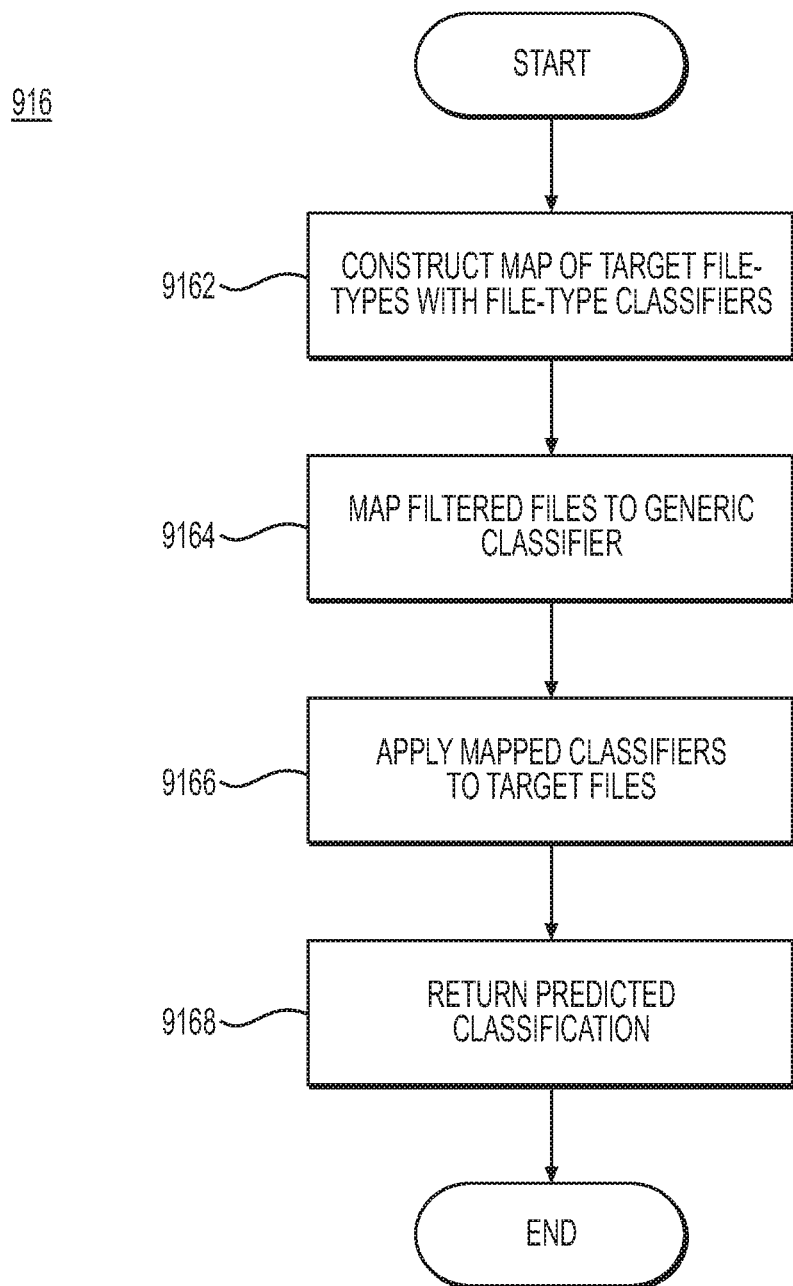
Figure 10:
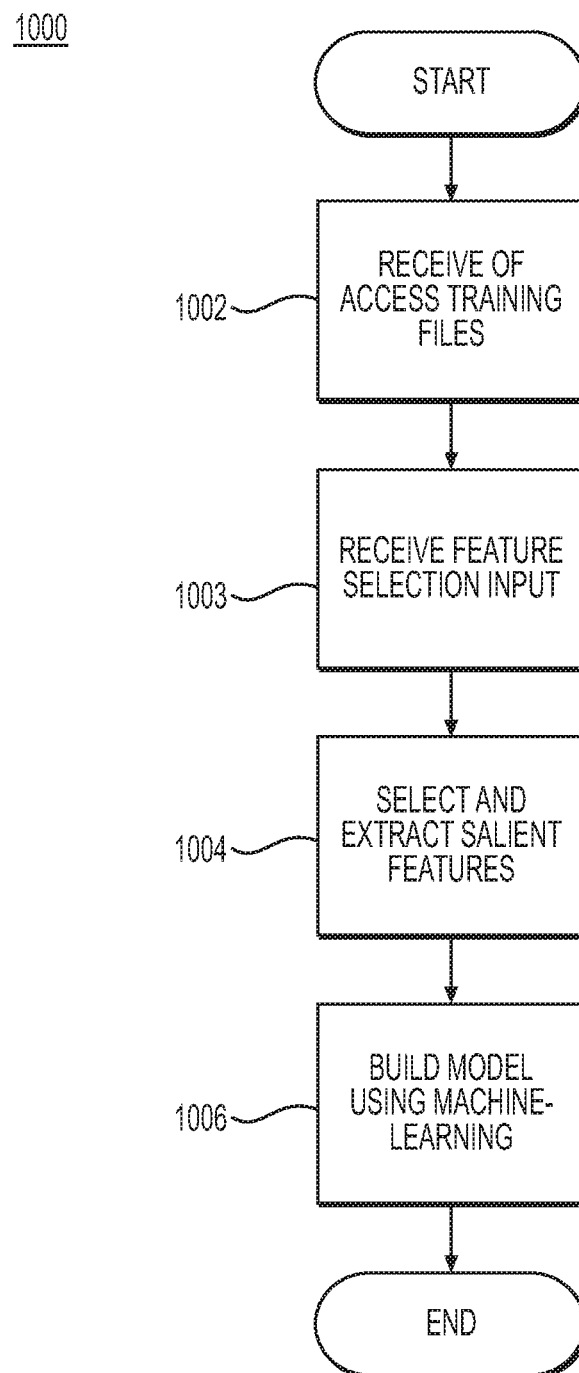
FIG. 10 is flowchart illustrating an embodiment of an improved system and method for automated machine-learning, zero-day malware detection that includes an improved feature selection subcomponent or module.
Figure 11:
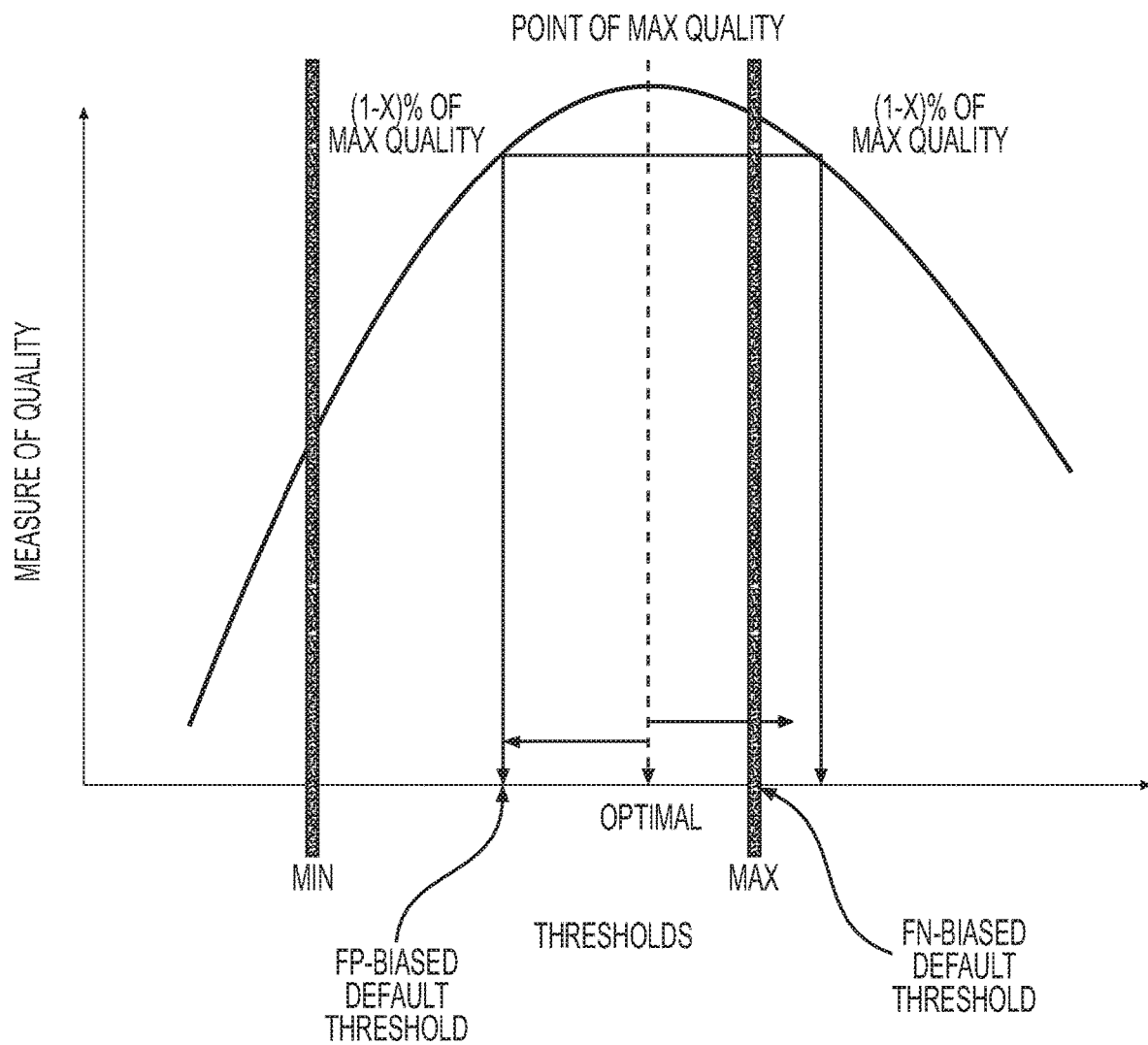
FIG. 11 is a graph illustrating an embodiment of an improved method for optimizing malware detection results using an algorithm to calculate default thresholds.

With reference now to FIGS. 9 to 11, illustrated are improvements that further improve upon the improved system and method for automated machine-learning, zero-day malware detection described above with reference to FIGS. 1 to 8. These embodiments are generally directed to the following improvements: 1) multi-stage file typing and pre-processing with fall-through options; 2) a feature selection module; and, 3) a tunable threshold setting algorithm. Embodiments of the multi-stage file typing and feature selection component described herein generally improve performance of the improved system and method for automated machine-learning, zero-day malware detection by increasing both the precision and recall of models resulting from training using the improved system and method for automated machine-learning, zero-day malware detection. Embodiments of the tunable threshold setting approach allow users to automatically bias the default (i.e., the automatically recommended) threshold setting toward either lower false positives or lower false negatives by providing a bound on the risk. Embodiments of the feature selection module may handle and enable the selection of non n-gram features and use feature selection techniques other than entropy-gain to select features.

Use of the improved system and method for automated machine-learning, zero-day malware detection provides many benefits. Such use, however, has revealed a few issues that may be addressed to further improve performance. The embodiments described herein improve upon the improved system and method for automated machine-learning, zero-day malware detection described above in a number of ways. For example, the embodiments overcome an issue of how to most accurately determine a file-type for an unknown sequence of bytes. Second, the embodiments overcome an issue of how best to determine features to use in a machine-learning process when using all available features is not feasible. Third, the embodiments overcome an issue of how to determine a default decision threshold for a binary classification model whose output is a confidence score that the sample being evaluated is of a particular type.

With continuing reference to FIGS. 9A TO 11, the embodiments include multiple novel features and a novel arrangement of features and techniques within the improved system and method for automated machine-learning, zero-day malware detection architecture. A hierarchical file-typing system with fall-through is an innovative approach to handling file-typing of malformed or maliciously crafted files. Embodiments of the feature selection module utilize a novel entropy-mask feature exclusion algorithm. Likewise, embodiments utilize a novel tunable threshold setting algorithm. These embodiments provide significant improvements on uncharacterized, real-world data feeds using our approach over the traditional optimization approach that defines the state of the art.

With specific reference to FIG. 9A, shown is an embodiment of a method 900 for detecting malware using multi-stage file-typing and, optionally pre-processing, with fall-through options. Method 900 may be used to build an improved composite classifier for malware detection. Method 900 achieves a significant improvement in accuracy over standard machine-learning malware detection schemes by (1) generating a composite classifier that includes classifiers for types of files (file-types) and (2) performing pre-processing prior to application of the composite classifier to determine the file-type of the target file. The pre-processing of the target file under analysis may be used to allocate the target file to a classifier specifically tailored to distinguish among benign or malicious files over a narrower category of files (e.g., a single file-type). This process is motivated by the empirical observation that machine-learning classifiers achieve superior accuracy when trained and operated on a category of objects of greater homogeneity (e.g., the same file-type).

In an embodiment, the narrowing of the field of scope of classification may be accomplished by:

1. Partitioning of files into distinct categories based on file-type;
2. Production of category-specific (e.g., file-type) classifiers based on the partitions from 1; and
3. The ability to allocate target unknown files (files for analysis) to appropriate category-specific classifiers (e.g., file-type classifiers) for classification on the fly. As can be seen from the above phases 1-3, method 900 may implement file-typing of files both in building classifiers and in applying the classifiers to classify target files. In building the category-specific classifiers, which may be concatenated into a composite classifier as discussed herein, method 900 may file-type the training files. In classifying target files, method 900 may file-type the target files and use the determined file-type to decide which category-specific classifier to apply. For example, method 900 may build file-type classifiers and apply a matching file-type classifier to target files of the same file-type.

With continuing reference to FIG. 9A, the first phase partitions the space of training files into meaningful sets of categories based on, for example, file-type (e.g., portable executables, pdfs, Word™ document files, Excel™ files, etc.) (block 902). Partitioning 202 of the training files may be a two part process: determine the file type of each training file and group the training files into groups of same-type files.

The file-typing described above, with reference to FIG. 2, used traditional techniques and tools, such as file extension, magic number techniques or distribution fingerprinting. File-typing using a magic number technique is similar to a signature based system. Specific byte patterns at known offsets in a file are used to identify the filetype. Many tools exist that use the magic number method such as the Unix file utility which is based on libmagic and TrID. The major benefit of this approach is it is very fast. The major drawback is that many files cannot be typed with sufficient granularity using magic numbers alone. Another, much less common approach, is to use character distributions within a file as a file-type signature. Distribution fingerprinting is relatively slow and inaccurate although it is more resilient because it does not rely on brittle byte signatures.

With continuing reference to FIG. 9A, method 900 implements a significantly enhanced partitioning or file-typing 902. With reference now to FIG. 9B, in embodiments, method 900 partitions or file-types 902 sample training files based on magic numbers as a first pass at the file-type (block 9022). In an embodiment, the first-pass or initial file-typing 9022 examines each sample file in a training set and determines and extracts the magic number for the sample training files. The first-pass file-typing 9022 generates or results in what is known as a magic string (i.e., a description of the file type that matches the magic number signature). These magic strings are mapped into the set of supported file-types (block 9024).

In embodiments, each supported file-type is associated with a single classification model. In other words, the training (block 904) may train file-type specific classification models. With reference now to FIG. 9C, in an embodiment, training 904 file-type specific classification models includes subjecting the collection of files for the file-type to n-gram feature selection and extraction analysis techniques (block 9042), as discussed above, to construct binary feature vector representations of each file (block 9044). Feature selection 9042 comprises evaluating features of all the files in the category to identify a subset of those that are the most effective at distinguishing between benign and malicious files. As noted herein, features may be n-grams or other types of features. An embodiment of the training 904 uses information gain techniques to evaluate these features. An embodiment of the training 904 may then use supervised machine-learning algorithms to train ada-boosted J48 decision trees on the training set. Alternative embodiments may use other techniques. For example, an embodiment of training may use supervised machine-learning algorithms to train 904 gradient boosting machines. Experimentally it has been found that the predictive capacity of these category specific classifiers is greatly enhanced when operating on files of their own category, at the cost of substantial degradation when operating on files of a different category. Training 904 may generate an overall file-type classification model (block 9046) by combining the feature vectors of the individual file feature vectors.

With reference again to FIG. 9A, in embodiments of method 900, supported file-types may be also associated with a file-type processing chain that includes other file-type classifiers (block 906). For example the PDF file-type may be associated 906 with other classifiers, e.g., PDF file-types may be associated with PDF_backup file-types or PE32.DLL.GUI file-types may be associated with PE32.DLL file-types which may be associated with PE32 file-types which may be associated with Generic file-types. When processing target files of the file-type to determine if malware, associated 906 file-type classifiers may be used to classify the target files.

With reference again to FIG. 9B, sometimes, although the initial file-typing 9022 has established a new sample file as a certain file-type, the sample file internal structure does not match the expected structure of that file-type. Method 900 addresses this problem by further processing each sample file to determine if the sample file internal structure matches the file-types expected structure (block 9026). If the sample training file internal structure does not match the expected structure, method 900 filters out the sample file, causing the sample training file to "fall through" the file-type classification model (and the typing chain associated with PE32.DLL.GUI, if any) (block 9028).

For example, when a new training sample, that the magic number based initial file-typing 9022 has established as a PE32.DLL.GUI file-type, and the further processing of the file determines 9026 that the file fails to match the expected internal structure of that file-type (e.g., due to mistyping or corruption), embodiments of the system will automatically filter out or cause the sample to "fall through" 9028 the file-type classification model and any applicable typing chain associated with PE32.DLL.GUI. As discussed herein, this process is executed on both training and target files so that classifier models are built using samples that cause the "fall through" behavior and classifier models are used on target files that fall through. The sample files that are fall-through or are filtered out 9028 may be collected into and used to train a generic file-type classifier (block 908). This approach improves accuracy by filtering out malformed or mistyped samples and training 908 a generic file-type classifier using these filtered sample files. Training 908 maybe performed as training 904 is described above. Typically these fall-through or filtered 908 generic file-type classifiers do not perform as well as file-type classifiers on an individual basis. However, the overall performance of a composite set of classifiers formed using the filtering-out or fall-through process 9028 is higher.

These file-type specific classifiers and the filtered, generic classifier may then be used to construct a composite classifier (block 910). The composite classifier includes three-operational components: a file categorizer definitions and configuration, a classifier manifest, and a collection of the file-type (or category) specific classifiers. The classifier manifest maps the file categories to the file-type (or category) specific classifiers. The classifier manifest may also indicate which are associated 906 file-types.

With reference now to FIG. 9E, the final phase of an embodiment of method 900 of detecting malware using multi-stage file-typing and, optionally pre-processing, with fall-through options includes receiving one or more target, unknown files for classification (block 912), initializing the composite classifier (block 914) and classification of target, unknown files via the composite classifier (block 916). With reference now to FIG. 9F, initializing the composite classifier 914 may include file-typing the received 912 target file (block 9142). The target file first undergoes file-typing using the file categorizer, which may use the process described above in phase one to determine the file-type and assign that file to a specific file category. As above, file-typing 9142 may include determining the magic string and mapping the magic strings into the set of supported file-types (block 9144). File-typing 9142 may also include determining if a target file internal structure matches the expected internal structure (block 9146). If the target file internal structure is determined 9146 to not match the expected structure, method 900 filters out the target file, causing the target file to "fall through" the file-type classification model (block 9148).

With reference now to FIG. 9G, the classifier manifest is used to construct a map which connects the file-types of the target, unknown file with the file-type specific classifiers (block 9162). Method 900 may also include connecting the filtered out target files to the generic file-type classifier (block 9164). The classification 916 then applies the mapped or connected classifier(s) to the target files (block 9166), returning the predicted classification (or probability that a file is malicious) to the composite classifier, which is in turn passed to a calling function or object (block 9168). With reference again to FIG. 9E, classification results may be displayed (block 918) by, e.g., the calling function or object of the system of detecting malware using multi-stage file-typing and pre-processing with fall-through options. Display 918 classification results may include a classification label 327, as shown in FIG. 3, and optimized as discussed with reference to FIG. 11 below.

With reference now to FIG. 9D, in addition to the improved file-typing approach described above, embodiments may also introduce a file pre-processing stage 901. Pre-processing 901 may occur prior to file partitioning 902 or initiating the composite classifier 914. In other words, file pre-processing 901 may occur prior to process of building a composite classifier or prior to process of applying the composite classifier to target files. File pre-processing 901 occurs, therefore, prior to any feature extraction, whether performing training or executing classifiers against unknown files (execution). Typical pre-processing 901 include file decompression, disassembly, decryption, unpacking, truncation detection, and file parsing. Applying file decompression, disassembly, decryption, or unpacking (block 9012) is fairly standard among malware analysts. However, applying truncation detection (block 9014) as part of a method for detecting malware using multi-stage file-typing and pre-processing is novel. Truncation detection 9014 parses file headers to determine expected section lengths and flags files as truncated where the total file buffer size (bytes in the file) is less than a sum of the section lengths. While the trunction detection 9014 technique does not guarantee detection of truncation (e.g., files may have undocumented sections; in this circumstance, trunctation detection 9014 may under-estimate the minimum buffer size), truncation detection 9014 is still sufficient to detect many, if not most, truncation events.

Truncation occurs frequently on web downloads. Such downloads may fail due to many reasons including networking errors, user-initiated aborts of the download, insufficient capacity for download, etc. A truncation error may cause a passive network sensor to re-construct a partial/truncated file. The traditional approach to file corruption detection is to compare a hash of the suspect file's content (e.g., typically MD5 or SHA256) to the hash of a known good version of the file. The comparing hash technique cannot be used when carving files from a network stream because not only is the hash of the known good version of the file not available in the stream, what file the user is even attempting to acquire is not always known. Applying truncation detection 9014 overcomes the disadvantages of the hash-comparing technique. If the method 900 detects a truncation using truncation detection 9014, method 900 further processes truncated files 9016. The further processing 9016 applied to the truncated files typically depends on the classifier being used. For example, further processing 9016 may remove the truncated files from analysis completely or the flag as a feature the fact that the truncated files are truncated. The structure of the file affects this decision. In some cases, the further processing 9016 may send truncated files to a fall-through classifier as described herein. A fall-through classifier is more generic and may be able to better handle truncated files that are unable to be parsed using normal means.

With reference now to FIG. 10, shown is an embodiment of an improved system and method for automated machine-learning, zero-day malware detection that includes an improved feature selection subcomponent or module. Method 1000 receives or accesses a set of training files including known malicious and benign files (e.g., training repository 1012) (block 1002). Similarly to methods 700 and 750 for automated machine-learning, zero-day malware detection shown in FIGS. 7A-7B, and particularly extraction 704 and 754, method 1000 selects and extracts salient features from the set of training files (block 1004). Feature extraction 1004 may be performed by or using an feature selection subcomponent or module improved from feature selection module used in extraction 704 and 754. In addition to performing feature extraction performing in methods 700 and 750, improved feature selection module may handle features other than n-gram features (i.e., non n-gram features) and use feature selection techniques other than entropy-gain. Accordingly, feature selection and extraction 1004 may extract enumerable features including features that have a fixed set of potential values such as present or absent. Alternative implementations may use continuously valued features through techniques such as discretization.

The enhanced feature selection module may allow users to configure the use of a feature selection algorithm implemented by selection module and, hence, feature selection and extraction 1004. Upon receipt of feature selection configuration input (e.g., from user) (block 1003), feature extraction 1004 may be implemented by enhanced feature selection module executing algorithms chosen from algorithms including random selection, entropy-gain, minimum Redundancy Maximum Relevance (mRMR), and a novel entropy-mask feature exclusion algorithm described below. In addition to adding new algorithms for feature selection, the feature selection module also allows users to chain feature extraction approaches and/or algorithms to create multi-stage feature selection 1004 using a hybrid approach. For example, system and method 1000 may configure 1003 (based, e.g., on user input, default settings, or automatically using computer-learning techniques) feature selection module to select the top, e.g., 20,000 features based on entropy-gain in a first stage of feature extraction 1004 and then, in a second stage of feature extraction 1004, extract from the set of 20,000 selected features a final set of, e.g., 5,000 features, using the more computationally intensive mRMR approach. Virtually any combination of feature selection algorithms, stages of selection, and sizes of selected feature sets may be configured 1003 and implemented by feature extraction 1004.

With continuing reference to FIG. 10, the novel entropy-mask feature exclusion algorithm allows features to be selected for training only if they are found within a training sample file in a neighborhood of relatively low entropy (i.e., an entropy threshold). In embodiments, the exact entropy threshold is configurable, e.g. based on configuration 1003. Typically, the entropy threshold is selected to exclude regions of a file that may be encrypted or compressed. In an embodiment, entropy-mask feature exclusion algorithm utilizes three techniques for defining regions. First, if the file is of a type with defined sections that can be discovered by parsing the file header (such as PE32) those sections may be used as regions (Approach 1). Second, a fixed region block size (such as 10 kB) may be defined and each consecutive block has its entropy calculated and all n-grams (or non n-gram feature) within each block are included/excluded based on the block entropy (Approach 2). Third, a sliding window of fixed size may be used (Approach 3). In this approach the n-gram (or non n-gram feature) under consideration is centered in the sliding window (to the extent possible), the entropy for the window is calculated, and the n-gram (or non n-gram feature) is included/excluded based on the calculated entropy within the sliding window. The window is then shifted a single n-gram (or non n-gram feature) toward the end of the file and the process is repeated until all possible n-grams (or non n-gram feature) have been evaluated for inclusion/exclusion. Approach 1 is relatively fast but limited in the number of filetypes it can be used on and assumes the section definitions in the header are complete and can be trusted. Approach 2 can be used on all filetypes but natural file section boundaries can cause mixed results. Approach 3 is both universal and significantly less sensitive to natural section boundaries but is much more computationally intensive.

With continuing reference to FIG. 10, extracted 1004 features may be used by method 1000 to build model (e.g., boosted decision tree) using machine learning tools (block 1006). Model may be built 1006 in similar manner as described above with reference to building 706 and 756. Analogously, feature extraction 1004 and feature extraction configuration 1003, and feature selection module used to implement same, may be applied to set of target unknown files for analysis by embodiments of system and method 1000 for zero-day malware detection (see, e.g., FIG. 2). Feature selection module, for example, may be used to extract n-gram or non n-gram features, in same manner as features extracted from training files, and model applied to extracted features from target files as described above to detect malware.

With reference to FIG. 3 discussed above, embodiments of system and method for zero-day malware detection generates a classification label 327 for each sample file. In addition to the classification label 327, embodiments of system and method for zero-day malware detection may also generate a confidence score between zero percent (0%) and one-hundred percent (100%) and include the confidence score in classification label 327. In embodiments, classification label 327 includes two labels (benign or malicious). In embodiments, confidence scores are remapped such that the output is always relative to a "malicious" determination. Hence, a 0% score is equivalent to being 100% confident that the sample was benign, a 100% score is equivalent to a 100% confidence that a sample is malicious, and a 50% score is equal certainty between the two classes.

To make a final decision as to whether to deem a sample as benign or malicious embodiments of the system and method allows users to adjust a decision threshold where samples receiving scores above the threshold are marked malicious. This gives the user the ability to dynamically tune the trade-off between system false positives and false negatives. The typical method of providing a default threshold is to either use the natural uncertainty point used by the learner in training (i.e., 50%) or to select an optimal threshold using a measure of quality for binary classification that is a function of the decision threshold (e.g., the Matthews correlation coefficient, F1 score, or Cohen's kappa) as measured against a verification or test set of samples not used for training.

With reference to FIG. 11, shown is a graph illustrating the selection of decision thresholds and the impact of thresholds on quality and optimization of quality. It shows a false-positive (FP)-biased default threshold and a false-negative (FN)-biased default threshold. By calculating, per algorithm shown below, optimal point of quality and acceptable deviations, optimal default thresholds that favor the desired error-type may be selected. As shown, embodiments expand on the approach of optimizing a measure of quality to determine a default decision threshold. Embodiments may relax the use of optimality by allowing users to specify an acceptable percent of deviation from the optimal value of the measure of quality, a desired error-type bias (i.e., a preference for false positives or false negatives), and user-provided minimum and maximum bounds on the threshold. Embodiments assume the measure of quality can be modelled as a smooth, concave, invertible function over the threshold domain. The algorithm works by first calculating the threshold that maximizes the measure of quality to optimal, and establishing two additional default threshold options based on the provided minimum and maximum, optimal threshold and the acceptable deviation. The default threshold is selected from the options so as to favor the desired error-type. The algorithm is formalized below:

Default={■(max (t_optimal,min (user_MAX,T^+((1−x)*Q(t_optimal)) &, FNbias@min (t_optimal,max (user_MIN,T^−((1−x)*Q(t_optimal))&, FP bias)┤ where (q)=Q^(−1) (q), Q(t_optimal)=max_t [(Q(t))] and T^+(q)>t_optimal and T^−(q)<t_optimal.

By providing a pre-biased default decision threshold, embodiments reduce the risk of selecting an overly aggressive threshold due to relatively flat measure of quality curve. This technique can be seen as a heuristic for reducing over fitting of a model to the training, test and verification samples. The appropriate classification label 327 can be determined and output by applying the decision thresholds calculated using the above algorithm.

Figure 12:
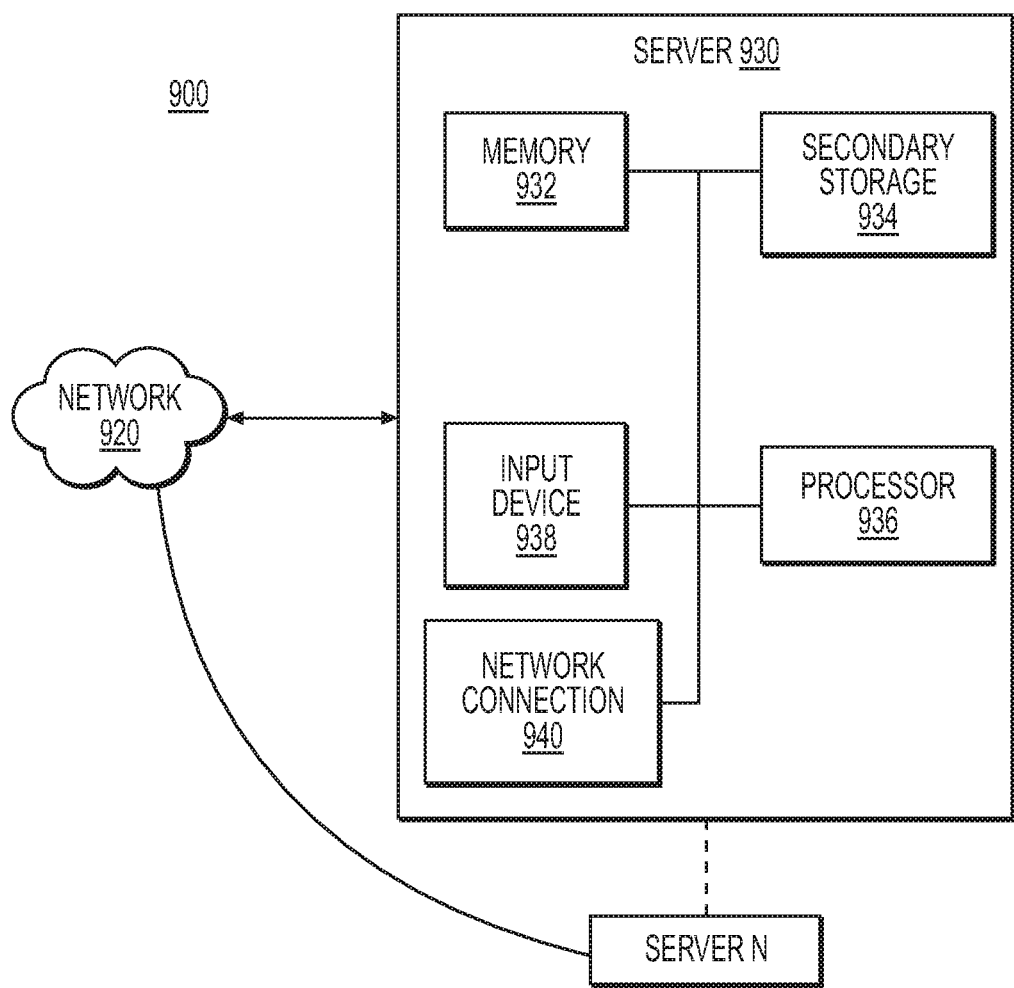
FIG. 12 is a block diagram of an exemplary hardware system that may be used to implement methods and systems described herein.

With reference to FIG. 12, shown is a block diagram of exemplary hardware that may be used to implement embodiments of an improved system and method for automated machine-learning, zero-day malware detection described herein. For example, hardware shown in FIG. 12 may store and execute programs, applications and routines and perform methods described herein. Embodiments may be implemented with any of a variety of hardware implementations including multiple server arrangements, cloud arrangements, etc. System 1200 may include a one or more servers 1230 connected with a network 920 such as the Internet.

Server 1230 typically includes a memory 1232, a secondary storage 1234, one or more processors 1236, an input device 1238, and a network connection 1240. Memory 1232 may include RAM or similar types of memory, and it may store one or more applications for execution by processor. Secondary storage 1234 may include a hard disk drive, CD-ROM drive, flash drive, thumb drive or other types of non-volatile data storage. Processor(s) 1236 executes the application(s), which are stored in memory or secondary storage, or received from the Internet or other network, and the processing may be implemented in software, such as software modules, for execution by computers or other machines. These applications preferably include instructions executable to implement the systems and perform the methods described herein, including those described with reference to FIGS. 1-11. Input device 1238 may include any device for entering information into server, such as a keyboard, mouse, cursor-control device, touch-screen, microphone, digital camera, etc. Network connection 1240 provides connection(s) for connecting to one or more networks (e.g., mobile network, Internet, internal network, etc.).

Server 1230 may store a database structure in secondary storage 1234, for example, for storing and maintaining data used in the embodiments of an improved system and method for automated machine-learning, zero-day malware detection described herein. Also, processor 1236 may execute one or more software applications in order to provide the functions described in this specification, specifically in the methods described herein, and the processing may be implemented in software, such as software modules, for execution by computers or other machines. The processing may perform methods described herein and produce output of methods for display by computers connected to server 1230. Optionally, the server 1230 may itself comprise a display device and/or an output device. A display device may include any type of device for presenting visual information such as, for example, a smart phone screen, computer monitor or other flat-screen display. The display device may display output of the methods described above. An output device may include any type of device for presenting a hard copy of information, such as a printer, and other types of output devices include speakers or any device for providing information in audio form.

Although only one server 1230 is shown, system 1200 may use multiple servers 1230 as necessary or desired to support the users and may also use back-up or redundant servers to prevent network downtime in the event of a failure of a particular server. Cloud computing servers may also be used. In addition, although server 1230 is depicted with various components, one skilled in the art will appreciate that these machines and the server can contain additional or different components. In addition, although aspects of an implementation consistent with the above are described as being stored in memory, one skilled in the art will appreciate that these aspects can also be stored on or read from other types of computer program products or computer-readable media. The computer-readable media may include instructions for controlling a computer system, such as machine and server, to perform a particular method, such as methods described herein.

Although the methods disclosed throughout this disclosure describe in detail identification and/or detection of malignant files, similar methods may alternatively or additionally be employed to identify and/or detect benign files.

The terms and descriptions used herein are set forth by way of illustration only and are not meant as limitations. Those skilled in the art will recognize that many variations are possible within the spirit and scope of the invention.

What is claimed is:

1. A method comprising:
   determining at least a first file-type and a second file-type associated with a plurality of files;
   determining, via a first classifier of a plurality of classifiers that is trained to determine whether files of the first file-type are at least malign or benign, a first classification for a first file of the plurality of files, wherein the first file is of the first file-type; and
   determining, via a second classifier of the plurality of classifiers that is trained to determine whether files of a plurality of file-types are at least malign or benign and based on a second file of the plurality of files being of the second file-type that is different than the first file-type, a second classification for the second file.

2. The method of claim 1, wherein the determining at least the first file-type further comprises:
   determining, based on at least one byte sequence at an offset in the first file, the first file-type; and
   determining, based on the first file-type, whether an internal structure of the first file matches an expected internal structure.

3. The method of claim 1, wherein training each classifier of the plurality of classifiers comprises:
   determining, based on at least one feature from each training file of a plurality of training files, that the at least one feature is indicative of whether content is malign; and
   generating, based on the at least one feature, at least one feature vector representation of each training file of the plurality of training files indicating whether the malign at least one feature is present in each training file of the plurality of training files.

4. The method of claim 1 further comprising:
   determining, via the second classifier and based on a file of the plurality of files being a truncated file, a third classification for the truncated file.

5. The method of claim 1, further comprising:
   determining, based on parsing a file header to determine an expected section length and determining that a total file buffer size is less than a sum of the section lengths, that a file of the plurality of files is a truncated file; and determining, via the second classifier and based on the file being a truncated file, a third classification for the truncated file.

6. The method of claim 1, wherein the first classification comprises at least one of malicious or benign, and wherein the second classification comprises at least one of malicious or benign.

7. The method of claim 1, further comprising:
determining, based on execution of a first algorithm of a plurality of algorithms in a first stage, that a plurality of features from a plurality of training files are indicative of whether content is malign; and
determining, based on execution of a second algorithm of the plurality of algorithms in a second stage, a portion of the plurality of features that are associated with a highest success rate of indicating whether content is malign.

8. The method of claim 7, wherein the plurality of algorithms comprises at least one of random selection, entropy-gain, minimum Redundancy Maximum Relevance (mRMR), or entropy-mask feature exclusion.

9. The method of claim 1, determining, based on at least one feature from each training file of a plurality of training files, that the at least one feature is indicative of whether content is malign, wherein the determining that the at least one feature is indicative of whether content is malign comprises:
comparing entropy of the at least one feature to a threshold.

10. The method of claim 9, wherein the threshold is configured based on information based on a user input.

11. The method of claim 1, determining, based on at least one feature from each training file of a plurality of training files, that the at least one feature is indicative of whether content is malign, wherein the at least one feature comprises an n-gram comprising a sequence of n consecutive bytes.

12. A device comprising:
one or more processors; and
memory storing instructions that, when executed by the one or more processors, cause the device to:
determine at least a first file-type and a second file-type associated with a plurality of files;
determine, via a first classifier of a plurality of classifiers that is trained to determine whether files of the first file-type are at least malign or benign, a first classification for a first file of the plurality of files, wherein the first file is of the first file-type; and
determine, via a second classifier of the plurality of classifiers that is trained to determine whether files of a plurality of file-types are at least malign or benign and based on a second file of the plurality of files being of the second file-type that is different than the first file-type, a second classification for the second file.

13. The device of claim 12, wherein the determining at least the first file-type further comprises:
determining, based on at least one byte sequence at an offset in the first file, the first file-type; and
determining, based on the first file-type, whether an internal structure of the first file matches an expected internal structure.

14. The device of claim 12, wherein training each classifier of the plurality of classifiers comprises:
determining, based on at least one feature from each training file of a plurality of training files, that the at least one feature is indicative of whether content is malign, wherein the at least one feature comprises an n-gram comprising a sequence of n consecutive bytes; and
generating, based on the at least one feature, at least one feature vector representation of each training file of the plurality of training files indicating whether the malign at least one feature is present in each training file of the plurality of training files.

15. The device of claim 14, wherein training each classifier of the plurality of classifiers comprises:
determining, based on at least one feature from each training file of a plurality of training files, that the at least one feature is indicative of whether content is malign, wherein determining that the at least one feature is indicative of whether content is malign comprises:
comparing entropy of the at least one feature to a threshold, wherein the threshold is configured based on information based on a user input.

16. The device of claim 12, wherein the instructions, when executed by the one or more processors, further cause the device to:
determine, via the second classifier and based on a file of the plurality of files being a truncated file, a third classification for the truncated file.

17. The device of claim 12, wherein the instructions, when executed by the one or more processors, further cause the device to:
determine, based on parsing a file header to determine an expected section length and determining that a total file buffer size is less than a sum of the section lengths, that a file of the plurality of files is a truncated file; and
determine, via the second classifier and based on the file being a truncated file, a third classification for the truncated file.

18. The device of claim 12, wherein the first classification comprises at least one of malicious or benign, and wherein the second classification comprises at least one of malicious or benign.

19. The device of claim 12, wherein the instructions, when executed by the one or more processors, further cause the device to:
determine, based on execution of a first algorithm of a plurality of algorithms in a first stage, that a plurality of features from a plurality of training files are indicative of whether content is malign; and
determine, based on execution of a second algorithm of the plurality of algorithms in a second stage, a portion of the plurality of features that are associated with a highest success rate of indicating whether content is malign.

20. The device of claim 19, wherein the plurality of algorithms comprises at least one of random selection, entropy-gain, minimum Redundancy Maximum Relevance (mRMR), or entropy-mask feature exclusion.

21. A non-transitory computer-readable storage medium storing computer-readable instructions that, when executed by a processor, cause:
determining at least a first file-type and a second file-type associated with a plurality of files;
determining, via a first classifier of a plurality of classifiers that is trained to determine whether files of the first file-type are at least malign or benign, a first classification for a first file of the plurality of files, wherein the first file is of the first file-type; and
determining, via a second classifier of the plurality of classifiers that is trained to determine whether files of a plurality of file-types are at least malign or benign and based on a second file of the plurality of files being of the second file-type that is different than the first file-type, a second classification for the second file.

22. The non-transitory computer-readable storage medium of claim 21, wherein the determining at least the first file-type further comprises:

determining, based on at least one byte sequence at an offset in the first file, the first file-type; and determining, based on the first file-type, whether an internal structure of the first file matches an expected internal structure.

* * * * *